(12) United States Patent
Fan et al.

(10) Patent No.: US 12,248,478 B2
(45) Date of Patent: Mar. 11, 2025

(54) METHOD AND APPARATUS FOR FEDERATED DATA QUERY, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Xiaoliang Fan, Shenzhen (CN); Jie Jiang, Shenzhen (CN); Yong Cheng, Shenzhen (CN); Chen Hou, Shenzhen (CN); Yuhong Liu, Shenzhen (CN); Peng Chen, Shenzhen (CN); Yangyu Tao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/335,424

(22) Filed: Jun. 15, 2023

(65) Prior Publication Data
US 2023/0325389 A1    Oct. 12, 2023

Related U.S. Application Data

(63) Continuation of application No. PCT/CN2022/107690, filed on Jul. 25, 2022.

(30) Foreign Application Priority Data

Aug. 27, 2021   (CN) ......................... 202110994560.3

(51) Int. Cl.
G06F 16/248       (2019.01)
G06F 16/2453      (2019.01)
(Continued)

(52) U.S. Cl.
CPC .. *G06F 16/24558* (2019.01); *G06F 16/24537* (2019.01); *G06F 16/24542* (2019.01); *G06F 16/248* (2019.01); *H04L 9/32* (2013.01)

(58) Field of Classification Search
CPC ............. G06F 16/248; G06F 16/24542; G06F 16/24537; G06F 16/24558; H04L 9/32
See application file for complete search history.

(56) References Cited

U.S. PATENT DOCUMENTS

| | | | |
|---|---|---|---|
| 2018/0096166 A1* | 4/2018 | Rogers | ................ G06F 16/951 |
| 2020/0117664 A1* | 4/2020 | Kondiles | ............. G06F 16/2246 |

(Continued)

FOREIGN PATENT DOCUMENTS

| | | |
|---|---|---|
| CN | 111382174 A | 7/2020 |
| CN | 112860738 A | 5/2021 |
| CN | 114328504 A | 4/2022 |

OTHER PUBLICATIONS

The World Intellectual Property Organization (WIPO) International Search Report for PCT/CN2022/107690 Oct. 10, 2022 7 Pages (including translation).

(Continued)

*Primary Examiner* — Tarek Chbouki
(74) *Attorney, Agent, or Firm* — ANOVA LAW GROUP, PLLC

(57) ABSTRACT

A method for federated data query includes: using, by a first electronic device, a joint query statement corresponding to a federated data query to obtain at least one operator containing a joint query operator; transforming the joint query operator to a first joint security operator; determining first data for intersection on the first electronic device by executing the first joint security operator, receiving second data for intersection from a second electronic device involved in the federated data query, and performing joint computing on the first data for intersection and the second (Continued)

---

Obtain at least one operator containing a joint query operator based on a joint query statement; the joint query statement being used for performing federated data query on a first electronic device and a second electronic device — S101

↓

Transform the joint query operator to a first joint security operator — S102

↓

Determine first data for intersection on the first electronic device by executing the first joint security operator, where synchronous execution of a second joint security operator is performed by the second electronic device to obtain second data for intersection, and perform joint computing on the first data for intersection and second data for intersection in a form of a ciphertext to obtain a joint data table — S103

↓

Determine a federated data query result corresponding to processing of the at least one operator based on the joint data table — S104 data for intersection in a form of a ciphertext to obtain a joint data table; and determining a federated data query result corresponding to the at least one operator based on the joint data table.

15 Claims, 10 Drawing Sheets

(51) Int. Cl.
    *G06F 16/2455*     (2019.01)
    *H04L 9/32*     (2006.01)

(56) References Cited

U.S. PATENT DOCUMENTS

| | | | |
|---|---|---|---|
| 2020/0210423 A1 | 7/2020 | Feng et al. | |
| 2021/0081410 A1* | 3/2021 | Chavan | G06F 9/30047 |
| 2023/0325389 A1 | 10/2023 | Fan et al. | |
| 2023/0401331 A1* | 12/2023 | Xu | H04L 9/0894 |
| 2024/0054129 A1* | 2/2024 | Yang | H04L 9/06 |

OTHER PUBLICATIONS

Ziyi Huang, In-depth reading of "Handwritten SQL Compiler—Syntax Tree", https://juejin.cn/post/6844903665304600584, Aug. 27, 2018 (Aug. 27, 2018). 12 Pages (including translation).

"Parsing Engine", https://shardingsphere.apache.org/document/legacy/3.x/document/cn/features/sharding/principle/parse/ 8 Pages (indluding translation).

Baidu Security Laboratory and Shanghai Jiao Tong University LATTICE Laboratory, "Multi-party Secure Computing Hotspot: Privacy-preserving set Intersection technology (PSI) analysis and research report" https://anquan.baidu.com/upload/ue/file/20190814/1565763561975581.pdf 19 Pages.

* cited by examiner

METHOD AND APPARATUS FOR FEDERATED DATA QUERY, ELECTRONIC DEVICE, AND COMPUTER-READABLE STORAGE MEDIUM

CROSS-REFERENCES TO RELATED APPLICATIONS

This application is a continuation application of PCT Patent Application No. PCT/CN2022/107690, entitled "DATA JOINT QUERY METHOD AND APPARATUS, ELECTRONIC DEVICE, COMPUTER READABLE STORAGE MEDIUM, AND COMPUTER PROGRAM PRODUCT" and filed on Jul. 25, 2022, which claims priority to Chinese Patent Application No. 202110994560.3 filed on Aug. 27, 2021, the entire contents of both of which are incorporated herein by reference.

FIELD OF THE TECHNOLOGY

The present disclosure relates to a database technology and a blockchain technology, in particular to a method and apparatus for federated data query, an electronic device, a computer-readable storage medium and a computer program product.

BACKGROUND OF THE DISCLOSURE

At present, a cross-data-source multi-table intersecting operation is usually involved in a data federated analytics scene. In the related technology, during cross-data-source multi-table intersecting processing, cross-source data exchange is usually performed on the basis of cross-authorization, calculation of an intersection is performed based on exchanged data, and an intersection data content for data federated analytics is obtained. A risk of stealing data by a counterpart participating in exchange or intercepting the data by a third party exists in a federated data query method in the related technology, so security of the data federated analytics is affected.

SUMMARY

Embodiments of the present disclosure provide a method and apparatus for federated data query, an electronic device, a computer-readable storage medium and a computer program product, which can improve security of the federated data query.

Technical solutions in the embodiments of the present disclosure are implemented as follows:

An embodiment of the present disclosure provides a method for federated data query, including: using, by a first electronic device, a joint query statement corresponding to a federated data query to obtain at least one operator containing a joint query operator; transforming the joint query operator to a first joint security operator; determining first data for intersection on the first electronic device by executing the first joint security operator; receiving second data for intersection from a second electronic device involved in the federated data query; performing joint computing on the first data for intersection and the second data for intersection in a form of a ciphertext to obtain a joint data table; and determining a federated data query result corresponding to the at least one operator based on the joint data table.

An embodiment of the present disclosure provides a method for federated data query, including: using, by a second electronic device, a joint query statement corresponding to a federated data query to obtain at least one operator containing a joint query operator; transforming the joint query operator to a second joint security operator; and determining second data for intersection on the second electronic device by executing the second joint security operator, receiving first data for intersection from a first electronic device involved in the federated data query, and performing joint computing on the second data for intersection and the first data for intersection in a form of a ciphertext to obtain a joint data table.

An embodiment of the present disclosure provides a first apparatus for federated data query, including: a first parsing processing module, configured to use a joint query statement corresponding to a federated data query to obtain at least one operator containing a joint query operator; a first transforming module, configured to transform the joint query operator to a first joint security operator; a first computing module, configured to determine first data for intersection on the first electronic device by executing the first joint security operator, receive second data for intersection from a second electronic device involved in the federated data query, and perform joint computing on the first data for intersection and the second data for intersection in a form of a ciphertext to obtain a joint data table; and a processing module, configured to determine a federated data query result corresponding to the at least one operator based on the joint data table.

An embodiment of the present disclosure provides a second apparatus for federated data query, including: a second parsing processing module, configured to use a joint query statement corresponding to a federated data query to obtain at least one operator containing a joint query operator; a second transforming module, configured to transform the joint query operator to a second joint security operator; and a second computing module, configured to determine second data for intersection on the second electronic device by executing the second joint security operator, receive first data for intersection from a first electronic device involved in the federated data query, and perform joint computing on the second data for intersection and the first data for intersection in a form of a ciphertext to obtain a joint data table.

An embodiment of the present disclosure provides a federated data query system, including a first electronic device and a second electronic device, the first electronic device and the second electronic device being connected with each other, the first electronic device being configured to perform parsing and operator partitioning on a joint query statement in sequence to obtain at least one operator containing a joint query operator; the joint query statement being used for synchronously initiating federated data query to the first electronic device and the second electronic device; and transform the joint query operator to a first joint security operator based on a preset security protocol; the second electronic device being configured to obtain at least one operator containing the joint query operator and corresponding to the joint query statement; the joint query statement being used for synchronously initiating federated data query to the first electronic device and the second electronic device; and transform the joint query operator to a second joint security operator based on a preset security protocol; the first electronic device and the second electronic device being further configured to perform data interaction and joint computing on first data for intersection of the first electronic device and second data for intersection of the second electronic device in a form of a ciphertext in sequence by synchronously executing the first joint security operator and the second joint security operator to obtain a joint data table on at least one of the first electronic device or the second electronic device; and at least one of the first electronic device or the second electronic device being further configured to obtain a federated data query result corresponding to the at least one operator based on the joint data table.

An embodiment of the present disclosure provides a first electronic device, including: at least one first memory, configured to store an executable instruction; and at least one first processor, configured to implement, when executing the executable instruction stored in the first memory, the method for federated data query executed by the first electronic device provided by this embodiment of the present disclosure.

An embodiment of the present disclosure provides a second electronic device, including: at least one second memory, configured to store an executable instruction; and at least one second processor, configured to implement, when executing the executable instruction stored in the second memory, the method for federated data query executed by the second electronic device provided by this embodiment of the present disclosure.

An embodiment of the present disclosure provides a non-transitory computer-readable storage medium, storing an executable instruction, the executable instruction being used for implementing, when executed by a first processor, the method for federated data query executed by a first electronic device provided by this embodiment of the present disclosure; or being used for implementing, when executed by a second processor, the method for federated data query executed by a second electronic device provided by this embodiment of the present disclosure.

The embodiments of the present disclosure have the following beneficial effects: the joint query operator is separated out from the joint query statement by parsing the joint query statement, the joint query operator is transformed to the first joint security operator, secure ciphertext transmission and computing are performed in sequence by combining executing for the second joint security operator by the second electronic device, a decentralized distributed computing process is implemented, analysis for data of a counterpart can be implemented on one's own device, data privacy of all participants in data federated analytics is protected at the same time in a manner of encrypted transmitting and computing, and thus security of federated data query can be improved.

DESCRIPTION OF EMBODIMENTS

Figure 1:
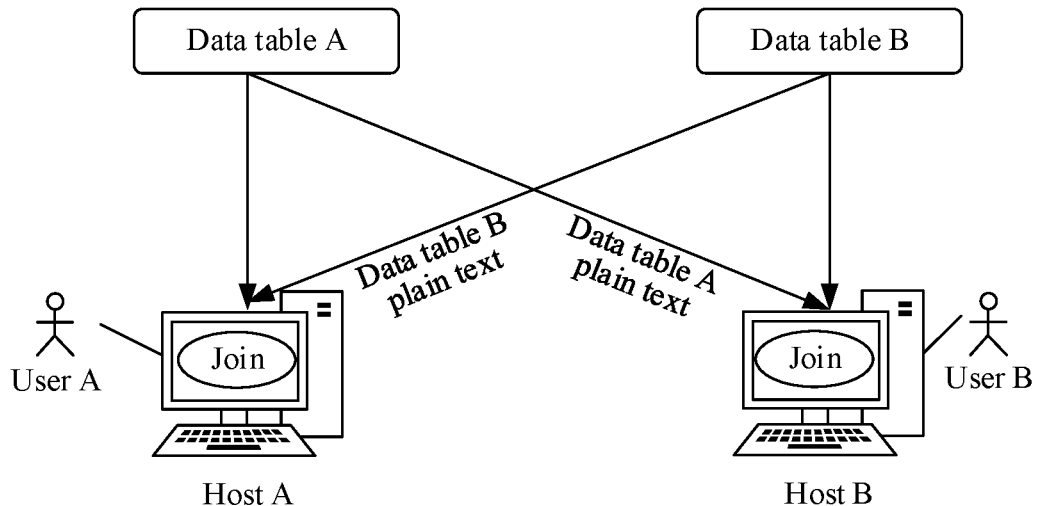
FIG. 1 is a schematic diagram of an interaction process of federated data query at present provided by an embodiment of the present disclosure.

To make objectives, technical solutions, and advantages of the present disclosure clearer, the following describes the present disclosure in further detail with reference to accompanying drawings. The described embodiments are not to be considered as a limitation to the present disclosure. All other embodiments obtained by a person of ordinary skill in the art without creative efforts fall within the protection scope of the present disclosure.

In the following description, the term "some embodiments" describes subsets of all possible embodiments, but it may be understood that "some embodiments" may be the same subset or different subsets of all the possible embodiments, and can be combined with each other in different manners without conflict.

In the following description, the terms "first\second\third" are to distinguish similar objects rather than represent specific orders for objects. It may be understood that "first\second\third" is interchangeable in a specific order or a precedence order in allowed circumstances, such that the embodiments of the present disclosure described herein can be implemented in an order besides an order illustrated or described here.

Unless otherwise defined, meanings of all technical and scientific terms used in the embodiments of the present disclosure are the same as those usually understood by a person skilled in the art to which the present disclosure belongs. Terms used in the embodiments of the present disclosure are intended to describe the embodiments of the present disclosure, but are not intended to limit the present disclosure.

Before the embodiments of the present disclosure are further described in detail, a description is made on nouns and terms involved in the embodiments of the present disclosure, and the nouns and terms involved in the embodiments of the present disclosure are applicable to the following explanations.

1) Federated analytics (FA): a kind of on-line analytical processing (OLAP), which decentralizes a process of analyzing data, so that data analysis may be performed without transmitting data to a centralized data center (such as a server), and data security may also be ensured in this data analysis process.

2) Private set intersection (PSI) protocol: used for enabling participants each of which possesses a data set to execute an intersection operation for the data set of each participant; and through the PSI protocol, enabling one or more participants to obtain intersection data, but the plurality of participants cannot be informed of any data except the intersection data in the data sets of the other participants.

3) Structured query language (SQL): a specific-purpose programming language and used for performing stream processing in a relational database management system (RDBMS) or a relational data stream management system (RDSMS). A joint query statement in the embodiments of the present disclosure may be an SQL statement.

4) Generic SQL (such as a computing engine (Spark SQL)): an SQL statement through a command line interface and open database connectivity (ODBC)/java database connectivity (JDBC) is used for implementing an operation for the computing engine (such as Spark). The joint query statement in the embodiments of the present disclosure may be a generic SQL statement, and the SQL statement includes the generic SQL statement.

5) JOIN: A JOIN statement in the SQL statement is used for combining a plurality of tables (also called data tables) in a database; and in other words, in SQL, a join operation is used to combine information from a plurality of relations. In the embodiments of the present disclosure, federated analytics is implemented through join.

6) Abstract syntax tree (AST): a syntax tree for short, which is an abstract representation of a source code (called a computer program, such as the joint query statement in the embodiments of the present disclosure) syntactic structure. The AST represents a syntactic structure of a source code in a shape of a tree, and each node on the tree represents a structure in the source code. Why the AST is described as "abstract" is that the AST includes the syntactic structure of the source code, which is unrelated to syntactic details of actual syntax.

7) Routing: which is a basic function of the node, and is used for supporting communication between nodes. Besides, the nodes may also include an application function, an on-chain function and the like besides a routing function.

8) Application: which is deployed in a blockchain, and is used for implementing a particular service according to an actual service demand, recording data related to function implementation to form recorded data, carrying a digital signature in the recorded data to indicate a source of task data, and transmitting the recorded data to other nodes in the blockchain network, so that the other nodes add the recorded data to a temporary block when verifying of a source and integrity of the recorded data succeeds. A service implemented by the application includes a wallet, a shared ledger, a smart contract and the like.

9) Wallet: used for providing a function of performing electronic money transaction, including transaction initiation (that is, a transaction record of a current transaction is transmitted to the other nodes in the blockchain network, and the other nodes, after successfully verifying, store the recorded data of the transaction in a temporary block in a blockchain in response to admitting that the transaction is valid). Certainly, the wallet further supports querying for remaining electronic money in an electronic money address.

10) Shared ledger: used for providing functions of operations such as storage, query, and modification of ledger data. Recorded data of the operations on the ledger data are transmitted to the other nodes in the blockchain network, the other nodes store, after verifying that the ledger data is valid, the recorded data in a temporary block in response to admitting that the ledger data is valid, and an acknowledgement may also be transmitted to a node initiating the operations.

11) Smart contract: which is a computerized agreement, is capable of executing clauses of a certain contract, and is implemented through a code that is deployed in the shared ledger and that is executed when a certain condition is met. The code is used for completing, according to an actual service demand, an automated transaction. For example, as for querying a delivery status of goods purchased by a purchaser, electronic money of the purchaser is transferred to an address of a merchant after the purchaser signs for the goods. Certainly, the smart contract may execute a contract used for a transaction, and may further execute a contract used for processing received information.

12) Blockchain: including a series of blocks that are consecutive in a chronological order of generation. Once a new block is added to the blockchain, the new block is no longer removed. The block records recorded data submitted by the node in the blockchain network.

In a SQL or generic SQL application scenario, multi-table intersecting (such as JOIN operation) is the most common operation in a multi-table federated analytics scenario. For example, a participant A is an operation department of a certain application (such as game, social and short video) and possesses APP feature data (such as registration, log in, a use duration and an operation feature), and a participant B is an application (APP) promotion channel party and possesses exposure data. Both A and B intend to perform joint computing (also called federated computing) of an exposure amount or a charging situation of a specified channel in a specified time period, which needs JOIN for data tables of the both parties and extract data meeting conditions for statistical analysis. In the related technology at present, when multi-table intersecting is implemented, a "join" statement in the SQL statement is usually used to combine a plurality of different tables in a database.

However, in an actual application scenario, due to user privacy protection, data protection regulations, commercial interest competition and other factors, different organizations or different departments of the same organization usually store and maintain data independently. These data distributed in the different organizations or the different departments cannot be gathered directly, and a phenomenon of "isolated data island" occurs. As shown in FIG. 1, the user A and the user B each possess own data: the user A possesses a data table A, the user B possesses a data table B, where physical isolation or permission isolation may be performed on the data table A and the data table B correspondingly through different storage spaces or different access permissions. In a scenario of completing a multi-table intersecting function by the both parties A and B by using data of the counterparts, in the related technology at present, when an multi-table intersecting operation is performed, usually, A applies for a data permission of the counterpart through a host A, B applies for a data permission of the counterpart through a host B, the data table A or the data table B are interacted with the counterpart in a form of a plain text by executing a JOIN statement in an SQL statement on the basis of being authorized, thus join computing is performed with a plain text of the data table B on the host A by using the data table A, join computing is performed with a plain text of the data table A on the host B by using the data table B, and intersection data of the data table A and the data table B are worked out in a cross-source manner.

It may be known based on FIG. 1 that in the related technology, when a two-table intersecting operation is implemented, as A and B are mutually authorized, involved data table need to be transferred to devices of the counterparts in a form of a plain text, or a computing node of a third party, there is a risk of stealing or leaking plain text data by the counterparts or the third party, and consequently, the security of federated data query is low.

Based on this, an embodiment of the present disclosure provides a method and apparatus for federated data query (also called joint data query), an electronic device, a computer-readable storage medium and a computer program product, which can improve the security of federated data query. An exemplary application of an electronic device provided by an embodiment of the present disclosure is described below. The electronic device provided by this embodiment of the present disclosure includes a first electronic device and a second electronic device, which may be respectively implemented as a notebook computer, a tablet computer, a desktop computer, a smart television, a set top box, a smart vehicle-mounted device, a mobile phone, a portable music player, a personal digital assistant, a dedicated messaging device, a portable game device and various other terminals, but not limited to them, and may be implemented as a server. The electronic device, when implemented as the server, may be a standalone physical server, or may also be a server cluster composed of a plurality of physical servers or a distributed system, or may also be a cloud server providing a cloud service, a cloud database, cloud computing, a cloud function, cloud storage, a network service, cloud communication, a middleware service, a domain name service, a security service, a content delivery network (CDN), big data, an artificial intelligence platform and other basic cloud computing services, which is not limited in this embodiment of the present disclosure. An exemplary application of the electronic device being implemented as a terminal is described below.

Figure 2A:
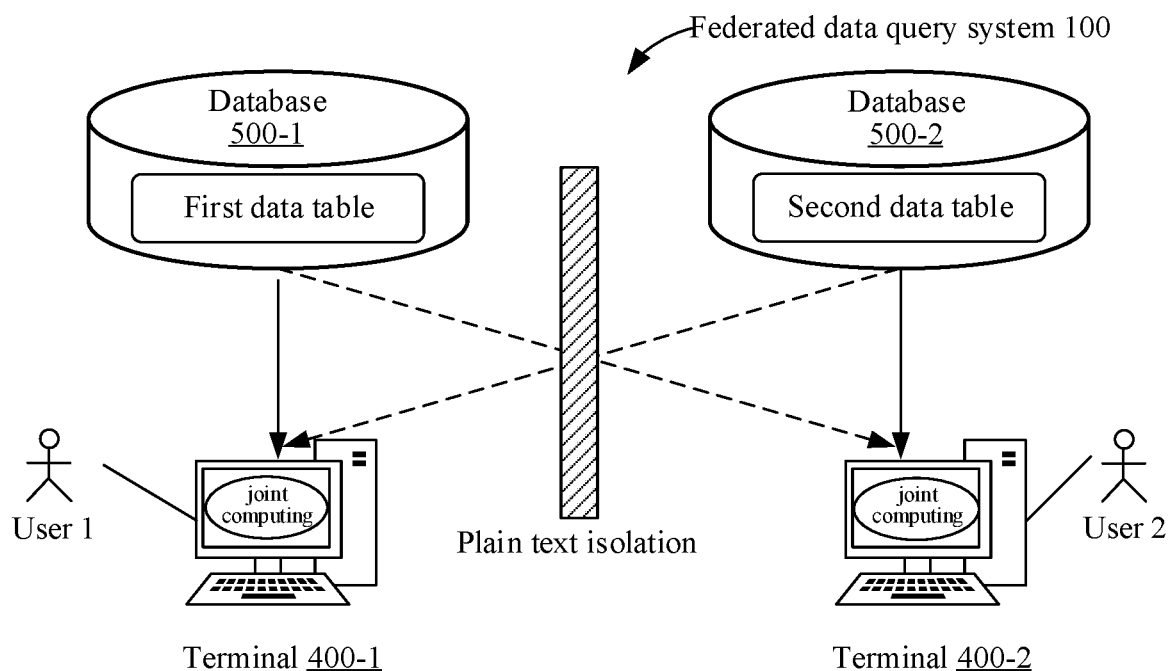
FIG. 2A is an example schematic structural diagram of an architecture of a federated data query system provided by an embodiment of the present disclosure.

Referring to FIG. 2A, FIG. 2A is an example architecture schematic diagram of a federated data query system 100 provided by an embodiment of the present disclosure. As shown in FIG. 2A, the first electronic device may be implemented as a terminal 400-1, and the second electronic device may be implemented as a terminal 400-2. A first data table of the first electronic device is stored in a preset first storage space of a database 500-1, and a second data table of the first electronic device is stored in a preset second storage space of a database 500-2. The terminal 400-1 is connected with the terminal 400-2 through a network, and the network may be a wide area network or a local area network, or a combination of the both. The terminal 400-1 and the database 500-1 are connected directly or indirectly in a wired or wireless communication mode. The terminal 400-2 and the database 500-2 are connected directly or indirectly in a wired or wireless communication mode. The terminal 400-1 belongs to a user 1, the terminal 400-2 belongs to a user 2. In a scenario that joint query needs to be performed on specified intersecting fields in the first data table or the second data table, the user 1 transmits, through the terminal 400-1, or the user 2 transmits, through the terminal 400-2, an instruction containing a joint query statement to the terminal 400-1 and the terminal 400-2 at the same time to initiate federated data query.

The terminal 400-1 is configured to perform parsing and operator partitioning on the joint query statement (also called federated query statement) in sequence to obtain at least one operator containing a joint query operator (also called federated query operator). The joint query statement is used for synchronously initiating the federated data query to the terminal 400-1 and the terminal 400-2. The joint query operator is transformed to a first joint security operator based on a preset security protocol. A joint security operator may also be called a federated security operator.

The terminal 400-2 is configured to obtain at least one operator containing a joint query operator and corresponding to the joint query statement. The joint query statement is used for synchronously initiating the federated data query to the terminal 400-1 and the terminal 400-2. The joint query operator is transformed to a second joint security operator based on a preset security protocol.

The terminal 400-1 and the terminal 400-2 are further configured to perform data interaction and joint computing on first data for intersection of the terminal 400-1 and second data for intersection of the terminal 400-2 in a form of a ciphertext in sequence by synchronously executing the first joint security operator and the second joint security operator, and at least one of the terminal 400-1 and the terminal 400-2 may obtain a joint computing result, namely, a joint data table. Therefore, plain text isolation of data interaction between the terminal 400-1 and the terminal 400-2 is implemented.

The terminal 400-1 is further configured to complete processing of the at least one operator based on the joint data table in a case of obtaining the joint data table to implement the federated data query.

The terminal 400-2 is further configured to complete processing of the at least one operator based on the joint data table in a case of obtaining the joint data table to implement the federated data query.

In some embodiments, the database 500-1 and the database 500-2 may be deployed in two independent physical storage spaces respectively, or may also be deployed in the same physical storage space, and are isolated from each other through different access permissions and operation permissions. The terminal 400-1 and the terminal 400-2 may also be connected directly or indirectly in a wired or wireless communication mode, which is selected according to actual conditions during actual implementation and is not limited in this embodiment of the present disclosure.

In some embodiments, the terminal 400-1 and the database 500-1 may be deployed on the same host, or may also be deployed on different hosts. Exemplarily, the database 500-1 may be deployed in a storage space of a cloud platform connected with the terminal 400-1, and the terminal 400-1 accesses the storage space of the cloud platform through network connection and may access to and operate data in the database 500-1 in a case of passing a permission validation of the cloud platform. Likewise, the terminal 400-2 and the database 500-2 may also be deployed on the same host or deployed on different hosts respectively, which is selected according to actual conditions during actual implementation and is not limited in this embodiment of the present disclosure.

In some embodiments, the terminal 400-1 may be implemented as a single host, or implemented as a host cluster of distributed computing; and the terminal 400-2 is the same as the terminal 400-1, which is selected according to actual conditions during actual implementation and is not limited in this embodiment of the present disclosure.

In some embodiments, the terminal 400-1 and the terminal 400-2 may also be implemented as two different clients on the same host; and exemplarily, clients corresponding to two applications on the same host respectively may perform data federated analytics on application data generated by the two applications, which is selected according to actual conditions during actual implementation and is not limited in this embodiment of the present disclosure.

In some embodiments, the joint query statement may also be transmitted by a third party device besides the terminal 400-1 and the terminal 400-2, and obtain the joint data table from the terminal 400-1 or the terminal 400-2 to perform the federated data query, which is selected according to actual conditions during actual implementation and is not limited in this embodiment of the present disclosure.

Figure 2B:
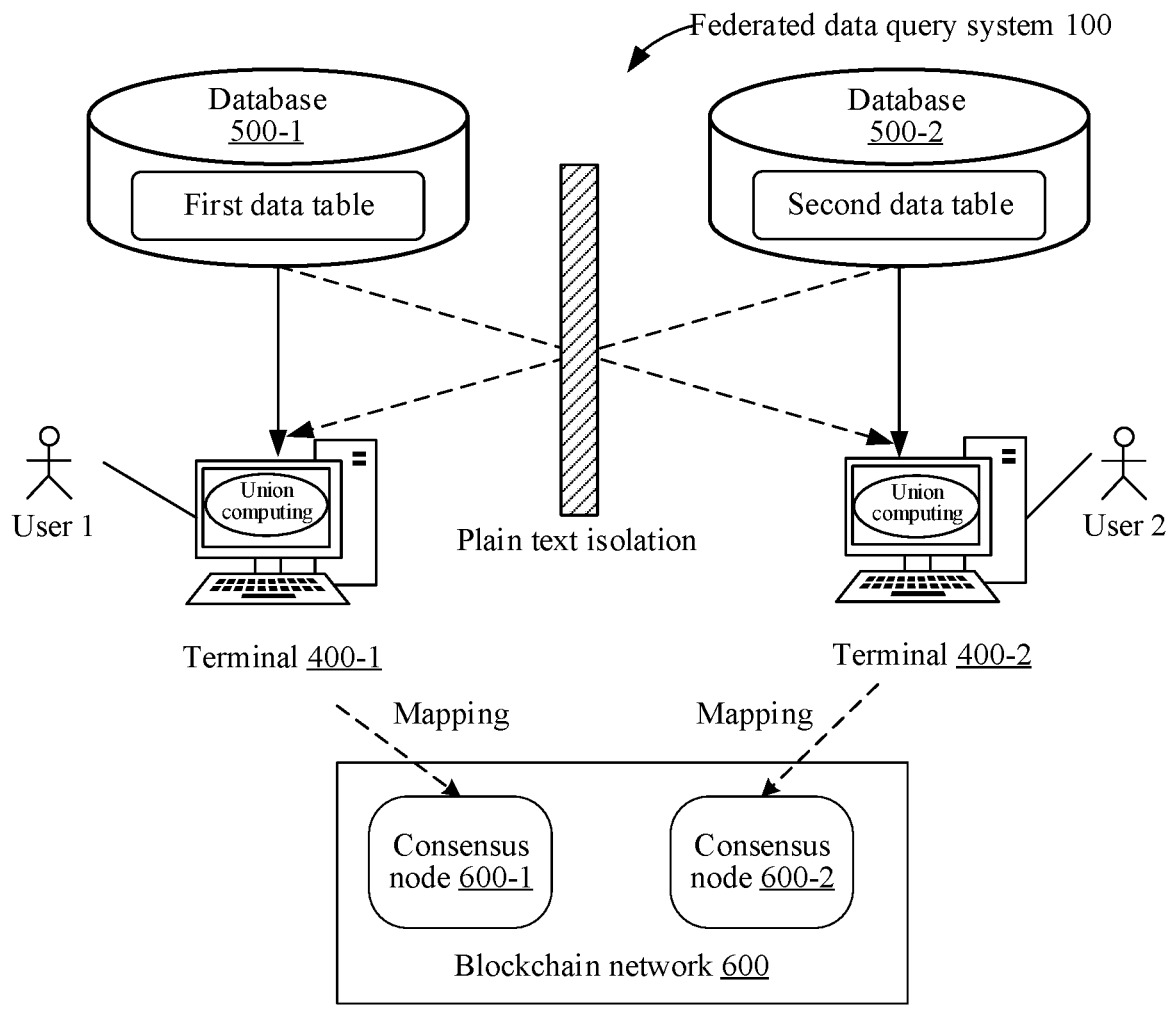
FIG. 2B is an example schematic structural diagram of a federated data query system being applied to a blockchain network provided by an embodiment of the present disclosure.

This embodiment of the present disclosure may also be implemented through a blockchain technology. Referring to FIG. 2B, FIG. 2B is an example schematic structural diagram of a federated data query system 100 being applied to a blockchain network provided by an embodiment of the present disclosure. A client and a plurality of nodes (any form of computing device connected into a network, such as a server and a user terminal) may be connected in a form of network communication to form a distributed blockchain network, and the federated data query may be performed between the nodes through the method provided by this embodiment of the present disclosure. In some embodiments, as shown in FIG. 2B, the terminal 400-1 and the terminal 400-2 may be added into the blockchain network 600 to become nodes therein. There are flexible and diverse types of blockchain networks 600, for example, may be any type of a public blockchain, a private blockchain or a consortium blockchain. Taking the public blockchain as an example, an electronic device of any service subject may access to the blockchain network 600 without being authorized to serve as a consensus node of the blockchain network 600, for example, the terminal 400-1 is mapped as a consensus node 600-1 in the blockchain network 600, and the terminal 400-2 is mapped as a consensus node 600-2 in the blockchain network 600.

Taking the blockchain network 600 as the consortium blockchain as an example, the terminal 400-1 and the terminal 400-2 may access to the blockchain network 600 after being authorized to become nodes. The terminal 400-1 performs parsing and operational unit partitioning on the received joint query statement to obtain at least one operator containing the joint query operator, transforms the joint query operator to the first joint security operator based on the preset security protocol, may then synchronously execute the first joint security operator and the second joint security operator on the terminal 400-2 in a manner of executing a smart contract, performs data interaction and joint computing on its own first data for intersection and the second data for intersection of the terminal 400-2 in a form of a ciphertext to obtain the joint data table, and transmits the joint data table into the blockchain network 600 for performing a consensus. When the consensus is achieved, processing of the at least one operator is completed based on the joint data table to implement the federated data query. Clearly, consensus confirmation is performed on the joint data table obtained by data joint computing through the plurality of nodes in the blockchain network, influence on the federated data query due to a mistaken operation or computing of several nodes is avoided by using a consensus mechanism, and thus the security and accuracy of the federated data query can be improved.

Figure 3:
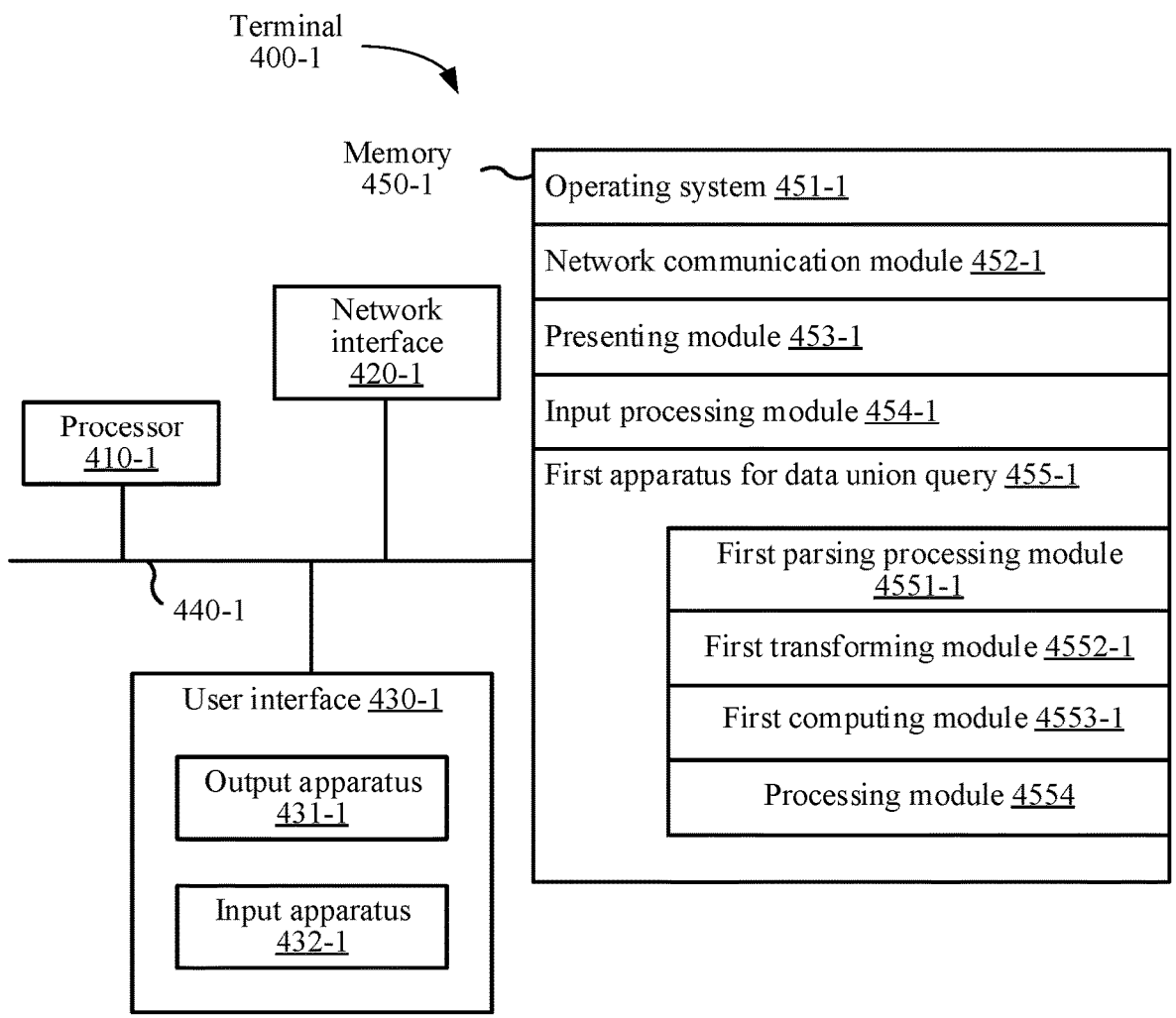
FIG. 3 is an example schematic structural diagram of an apparatus for federated data query provided by an embodiment of the present disclosure.

Referring to FIG. 3, FIG. 3 is a schematic structural diagram of a terminal 400-1 provided by an embodiment of the present disclosure. The terminal 400-1 shown in FIG. 3 includes: at least one processor 410-1, a memory 450-1, at least one network interface 420-1 and a user interface 430-1. All components in the terminal 400-1 are coupled together by using a bus system 440-1. It may be understood that the bus system 440-1 is configured to implement connection and communication between these components. In addition to a data bus, the bus system 440-1 further includes a power bus, a control bus and a state signal bus. But, for ease of clear description, all types of buses in FIG. 3 are marked as the bus system 440-1.

The processor 410-1 may be an integrated circuit chip and has a signal processing capability, for example, a general-purpose processor, a digital signal processor (DSP), or other programmable logic devices, a discrete gate or a transistor logic device, a discrete hardware component and the like, where the general-purpose processor may be a microprocessor or any conventional processor or the like.

The user interface 430-1 includes one or more output apparatuses 431-1 capable of presenting a media content, including one or more speakers and/or one or more visual display screens. The user interface 430-1 further includes one or more input apparatuses 432-1, including a user interface component useful for user input, such as a keyboard, a mouse, a microphone, a touch display screen, a camera, other input buttons and a control.

The memory 450-1 may be removable, unremovable or a combination of the both. An exemplary hardware device includes a solid state memory, a hard disk drive, an optical driver and the like. The memory 450-1 may include one or more storage devices physically away from the processor 410-1.

The memory 450-1 includes a volatile memory or a non-volatile memory, or may also include both the volatile memory and the non-volatile memory. The non-volatile memory may be a read only memory (ROM), and the volatile memory may be a random access memory (RAM). The memory 450-1 described in this embodiment of the present disclosure intends to include any suitable type of memory.

In some embodiments, the memory 450-1 can store data to support various operations, and examples of these data include a program, a module and a data structure or a subset or a superset thereof, which is described below with examples.

An operating system 451-1 includes a system program for processing various basic system services and executing hardware related tasks, for example, a frame layer, a core library layer, and a drive layer, for implementing various basic services and processing tasks based on hardware.

A network communication module 452-1 is configured to reach other computing devices via one or more (wired or wireless) network interfaces 420-1, and exemplarily, the network interface 420-1 includes: Bluetooth, Wi-Fi, a universal serial bus (USB) and the like.

A presenting module 453-1 is configured to present information (such as a user interface configured to operate a peripheral device and display a content and information) via one or more output apparatuses 431-1 (such as a display screen and a speaker) associated with the user interface 430-1.

An input processing module 454-1 is configured to detect one or more user inputs or interactions from one of one or more input apparatuses 432-1 and interpret the detected inputs or interactions.

In some embodiments, the apparatus provided by this embodiment of the present disclosure may be implemented in a form of software. FIG. 3 shows a first apparatus 455-1 for federated data query stored in the memory 450-1, which may be software in a form of a program, a plug-in and the like, including the following software modules: a first parsing processing module 4551-1, a first transforming module 4552-1, a first computing module 4553-1 and a processing module 4554, where these modules are logical, so they may be combined at will or further split according to implemented functions.

Figure 4:
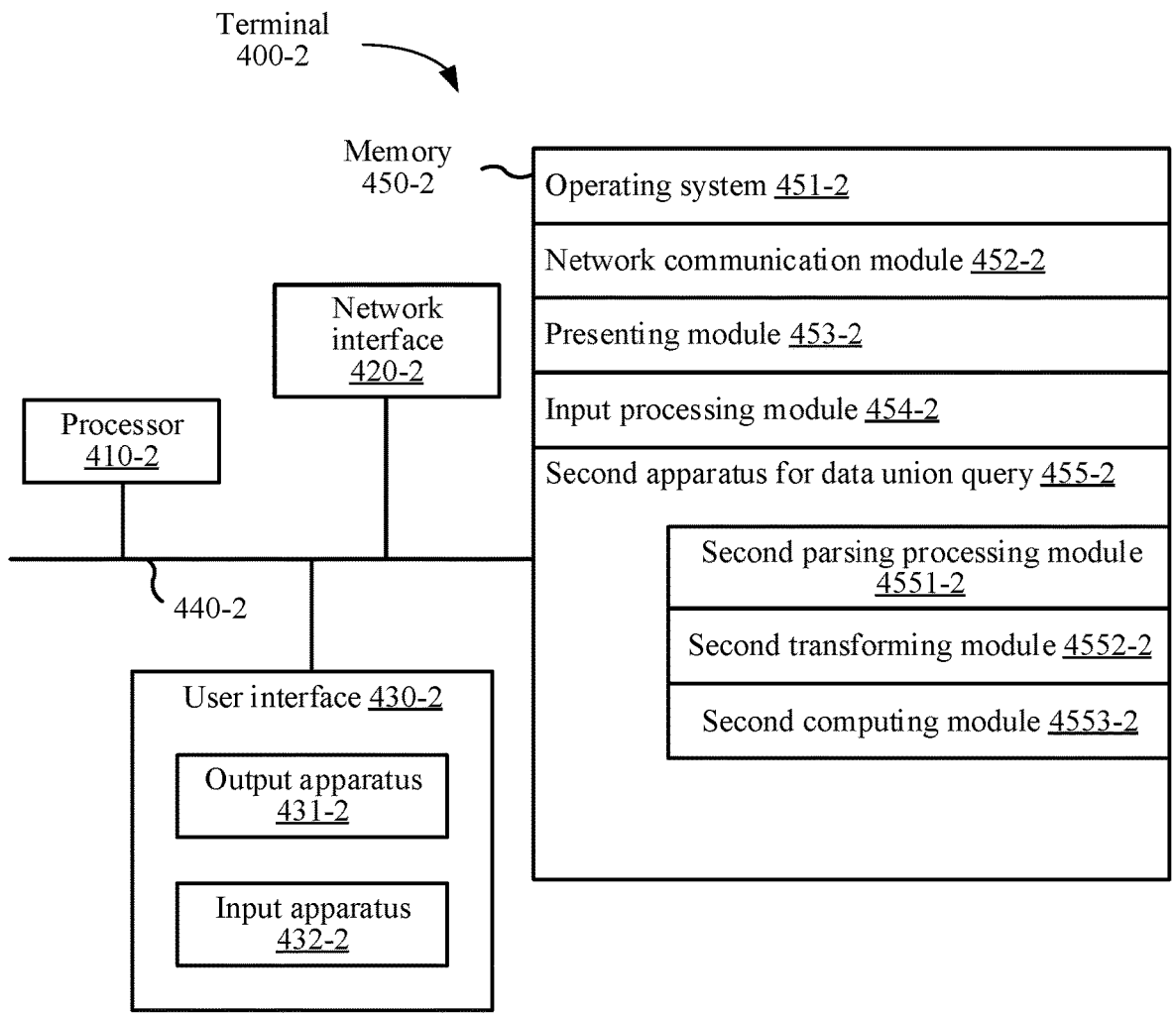
FIG. 4 is another example schematic structural diagram of an apparatus for federated data query provided by an embodiment of the present disclosure.

Referring to FIG. 4, FIG. 4 is a schematic structural diagram of a terminal 400-2 provided by an embodiment of the present disclosure. The terminal 400-2 shown in FIG. 4 includes: at least one processor 410-2, a memory 450-2, at least one network interface 420-2 and a user interface 430-2. All components in the terminal 400-2 are coupled together by using a bus system 440-2. The above modules are consistent with function description of the modules with the same names in FIG. 3, which is not repeatedly described here. FIG. 4 also shows a second apparatus 455-2 for federated data query stored in the memory 450-2, which may be software in a form of a program, a plug-in and the like, including the following software modules: a second parsing processing module 4551-2, a second transforming module 4552-2 and a second computing module 4553-2, where these modules are logical and may be combined at will or further split according to implemented functions.

Functions of all the modules will be described below.

In some embodiments, the first apparatus for federated data query provided by this embodiment of the present disclosure may be implemented in a form of hardware. As an example, the first apparatus for federated data query provided by this embodiment of the present disclosure may be a first processor in a form of a hardware decoding processor, which is programmed to execute the method for federated data query provided by this embodiment of the present disclosure, for example, the processor in the form of the hardware decoding processor may adopt one or more application specific integrated circuits (ASICs), DSPs, programmable logic devices (PLDs), complex programmable logic devices (CPLDs), field-programmable gate arrays (FPGAs) or other electronic elements.

Figure 5:
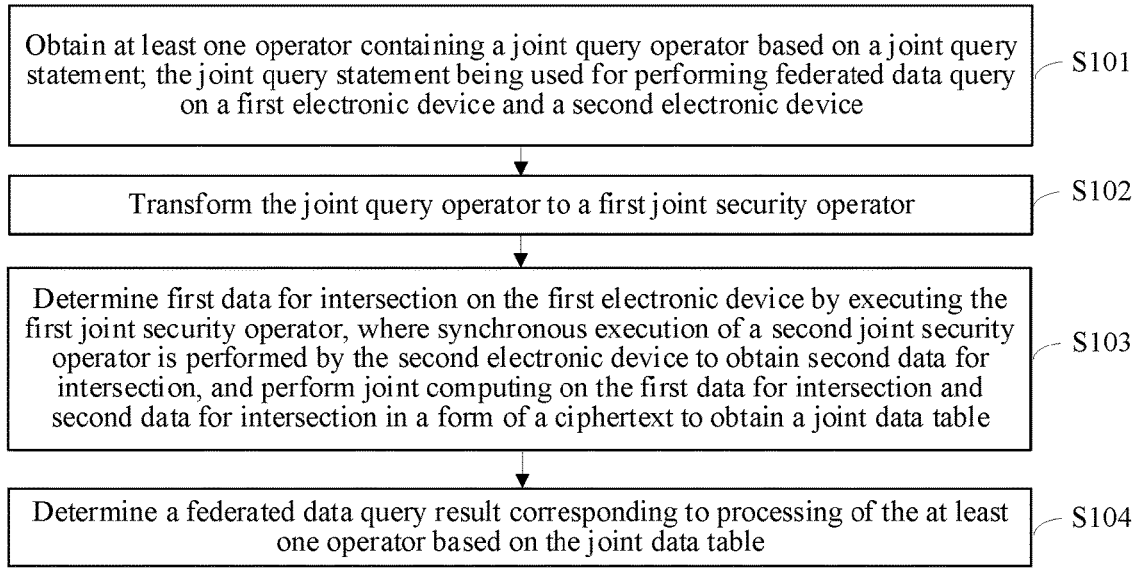
FIG. 5 is a first example schematic flowchart of a method for federated data query provided by an embodiment of the present disclosure.

The method for the federated data query provided by this embodiment of the present disclosure will be described below with reference to an exemplary application and implementation of being applied to a first electronic device, such as the terminal 400-1, provided by this embodiment of the present disclosure. Referring to FIG. 5, FIG. 5 is a first example schematic flowchart of a method for federated data query provided by an embodiment of the present disclosure. Description will be made with reference to steps shown in FIG. 5.

S101. Obtain at least one operator containing a joint query operator based on a joint query statement; the joint query statement being used for performing federated data query on the first electronic device and a second electronic device.

The method for federated data query provided by this embodiment of the present disclosure may be widely applicable to a multi-table intersecting operation in a joint computing and data federated analytics scenario. During actual applications, it may be implemented as a basic security operator of joint computing or joint data, for being called by other modules, such as a joint computing module or a federated analytics module, in a joint computing engineering product. It may also be applied to a public cloud or a private cloud in a form of a joint computing platform for providing a joint computing service and security federated analytics, which is selected according to actual conditions during actual implementation and is not limited in this embodiment of the present disclosure.

In some embodiments, an initiator user may input the joint query statement into the first electronic device or the second electronic device to initiate the federated data query through the joint query statement. The first electronic device or the second electronic device receives the joint query statement through a human-computer interactive interface, and starts own processing for the joint query statement to generate a joint query request according to the joint query statement, and transmits the joint query request to an opposite side device through a network so that the opposite side device synchronously starts processing for the joint query statement.

In some embodiments, the initiator user may also be a third party, that is, the third party initiates the federated data query to the first electronic device and the second electronic device at the same time through the joint query statement in a third electronic device, and the first electronic device and the second electronic device synchronously start processing for the joint query statement in a case of receiving the joint query statement.

In some embodiments, the joint query statement may be an instruction statement in a syntactic form of a standard SQL or generic SQL of a database (such as a MYSQL database, a SQLServer database, a Spark database and a Hive database), which is selected according to actual conditions during actual implementation and is not limited in this embodiment of the present disclosure.

In some embodiments, the joint query statement may include a JOIN statement based on a national standards institute (ANSI) for obtaining data of a multi-table intersection part. The JOIN statement may include an INNER JOIN, a FULL OUTER JOIN, a LEFT OUTER JOIN, a RIGHT OUTER JOIN and a CROSS JOIN and many other manners. Exemplarily, Table 2 with a name of Department includes a field content corresponding to a field of DepartmentName and a content corresponding to a field of Department ID, where the field of DepartmentID (called Department.DepartmentID) is a primary key; Table 1 with a name of Employee includes a field content corresponding to a field of Name and a content corresponding to a field of DepartmentID, where the field of DepartmentID (called Employee.DepartmentID) is a foreign key; and here, a JOIN statement for implementing intersecting of Table 1 and Table 2 in a manner of INNER JOIN may include "SELECT * FROM Employee INNER JOIN Department ON Employee.DepartmentID=Department.DepartmentID".

TABLE 1

| Name | DepartmentID |
|---|---|
| Rafferty | 31 |
| Jones | 33 |
| Heisenberg | 33 |
| Robinson | 34 |
| Smith | 34 |
| Williams | NULL |

TABLE 2

| DepartmentID | DepartmentName |
|---|---|
| 31 | Sales |
| 33 | Engineering |
| 34 | Clerical |
| 35 | Marketing |

An executing result of the above JOIN statement for intersecting is shown in Table 3, including a field content corresponding to a field of Employee.Name and a field content corresponding to a field of Employee.DepartmentID.

TABLE 3

| Employee.Name | Employee.DepartmentID |
|---|---|
| Robinson | 34 |
| Jones | 33 |
| Smith | 34 |
| Heisenberg | 33 |
| Rafferty | 31 |

In some embodiments, the joint query statement may also be a statement of other multi-table data joint operations, which is selected according to actual conditions during actual implementation and is not limited in this embodiment of the present disclosure.

In this embodiment of the present disclosure, the first electronic device may parse the joint query statement in a form of a human-computer interactive language to determine a meaning of an instruction contained in the joint query statement, and perform granularity partitioning on one or more operational units contained in the joint query statement to obtain the at least one operator corresponding to the joint query statement. Here, in a federated data query scenario, the joint query statement at least contains a joint query operation, such as a statement part of an intersecting operation, used for computing intersection parts of data tables of different participants to serve as a basis of the federated data query. Therefore, the at least one operator at least contains the joint query operator corresponding to the joint query operation.

S102. Transform the joint query operator to a first joint security operator.

In this embodiment of the present disclosure, the first electronic device may transform an intersection computing task to the first joint security operator based on a preset security protocol so as to perform security protection on a cross-source intersecting operation through the first joint security operator without leaking a data plain text content.

In some embodiments, the first electronic device may establish an intersection security operator by using a preset security protocol such as homomorphic encryption, differential privacy, semi-homomorphic encryption, secret sharing and secure multi-party computation. In other words, the preset security protocol is used for establishing the intersection security operator, including at least one type of homomorphic encryption, differential privacy, semi-homomorphic encryption, secret sharing and secure multi-party computation. Exemplarily, a PSI operator may be established through secure multi-party computation, and packaging of an implementation logic may also be performed based on other preset security protocols, so as to establish other types of first joint security operators, which is selected according to actual conditions during actual implementation and is not limited in this embodiment of the present disclosure.

S103. Determine first data for intersection on the first electronic device by executing the first joint security operator, where synchronous execution of a second joint security operator is performed by the second electronic device to determine second data for intersection; receive the second data for intersection from the second electronic device involved in the federated data query; and perform joint computing on the first data for intersection and the second data for intersection determined on the second electronic device in a form of a ciphertext to obtain a joint data table.

In this embodiment of the present disclosure, the first electronic device may start processing for the at least one operator through an executing engine in a case of transforming the joint query operator to the first joint security operator.

In some embodiments, the first electronic device may distribute an operator in the at least one operator to at least one executing engine for parallel processing. The at least one executing engine may be deployed on the first electronic device, or may also be deployed on a third electronic device of at least one third party and is driven by the first electronic device, which is selected according to actual conditions during actual implementation and is not limited in this embodiment of the present disclosure.

In this embodiment of the present disclosure, executing for the first joint security operator by the executing engine of the first electronic device needs to be synchronous with executing for the second joint security operator by an executing engine of the second electronic device. Here, the second electronic device may also perform parsing and operational unit partitioning on the joint query statement in sequence and perform transformation processing based on the preset security protocol to obtain the second joint security operator corresponding to the joint query operator in the joint query statement. In this way, in response to that the first electronic device starts executing for the first joint security operator, executing for the second joint security operator is synchronously started on the second electronic device through the preset security protocol, such as a PSI protocol.

In this embodiment of the present disclosure, the second joint security operator executed on the second electronic device needs to be established by using the same security protocol as the first joint security operator, so as to implement ciphertext interaction between the first electronic device and the second electronic device.

In some embodiments, an implementation solution of the PSI protocol may include a solution based on a blind signature, a solution based on oblivious transfer, a solution based on secure sample alignment (such as a Freedman protocol), which is selected according to actual conditions during actual implementation and is not limited in this embodiment of the present disclosure.

In this embodiment of the present disclosure, executing the first joint security operator by the first electronic device may be synchronous with executing the second joint security operator by the second electronic device, so that the first data for intersection of the first electronic device may intersect with the second data for intersection of the second electronic device in a form of a ciphertext, and intersecting computing is performed through intersection to obtain the joint data table.

S104. Determine a federated data query result corresponding to processing of the at least one operator based on the joint data table.

In this embodiment of the present disclosure, the joint data table contains an equivalent mapping relationship in the first data for intersection and the second data for intersection. When the at least one operator is one operator, the joint data table is the federated data query result. When the at least one operator is a plurality of operators, the first electronic device may execute operators representing other arithmetic operations in the plurality of operators based on the joint data table to implement different data processing functions based on the joint data table, so as to complete processing for the plurality of operators and implement the federated data query for the first data for intersection and the second data for intersection, and at this moment, the federated data query result includes data processing results of the operators of the other arithmetic operations.

In some embodiments, the at least one operator may further include a Count operator, and the first electronic device may statistically calculate the number of data items in the joint data table through the Count operator to serve as the number of intersection data of the first data for intersection and the second data for intersection, so as to implement the federated data query of a counting function. Or, the at least one operator may further include a maximizing operator, a minimizing operator and the like. The first electronic device may also implement the federated data query of an extreme value solving function of the intersection data based on the joint data table through the maximizing operator, the minimizing operator and the like, which is selected according to actual conditions during actual implementation and is not limited in this embodiment of the present disclosure.

It may be understood that by parsing the joint query statement, the joint query operator is separated out of the joint query statement, the joint query operator is transformed to the first joint security operator, secure ciphertext transmission and computing are performed in sequence by combining execution for the second joint security operator by the second electronic device, a decentralized distributed computing process is implemented, analysis for data of the counterparts can be implemented on one's own device, data privacy of all participants in the data federated analytics is protected at the same time in a manner of encrypted transmission and computing, and thus the security of the federated data query can be improved.

Figure 6:
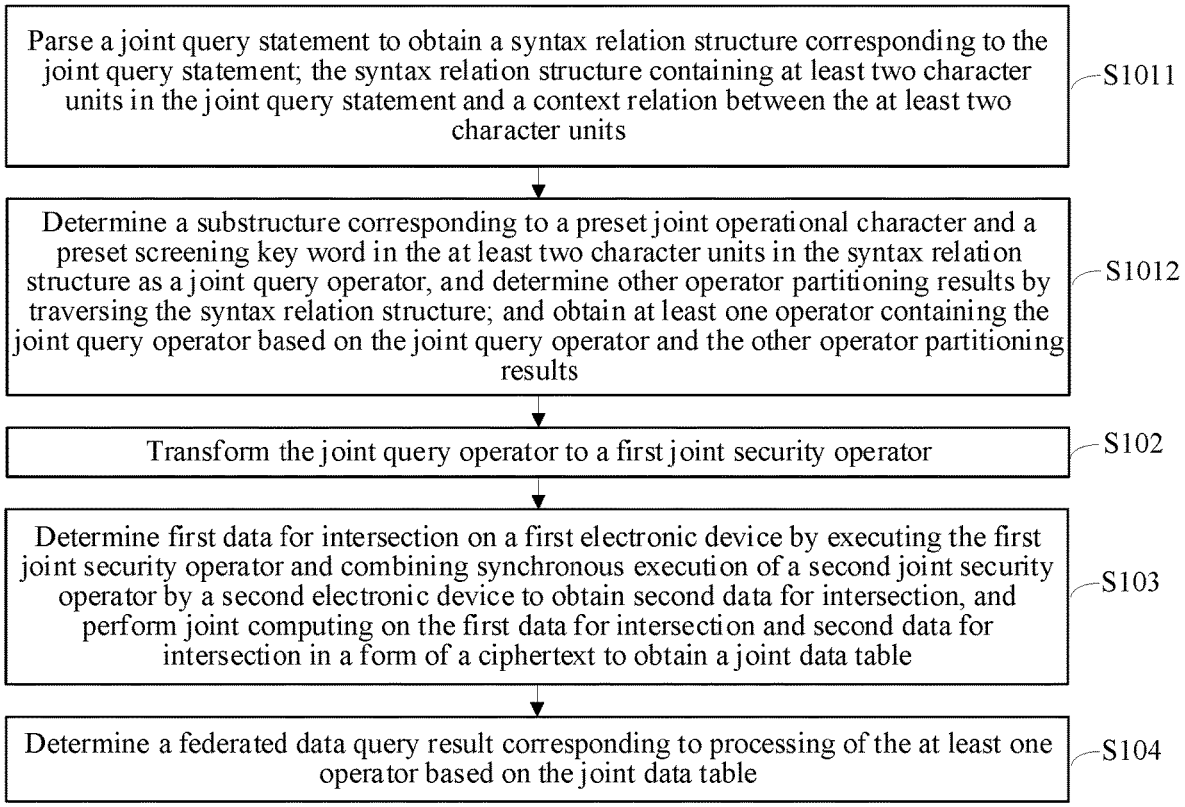
FIG. 6 is a second example schematic flowchart of a method for federated data query provided by an embodiment of the present disclosure.

In some embodiments, based on FIG. 5 and as shown in FIG. 6, S101 may be implemented through S1011 to S1012, which will be described with reference to all steps.

S1011. Parse the joint query statement to obtain a syntax relation structure corresponding to the joint query statement; the syntax relation structure containing at least two character units in the joint query statement and a context relation between the at least two character units.

In this embodiment of the present disclosure, the first electronic device may implement parsing (called syntactic analysis) of the joint query statement through lexical parsing and syntactic parsing to obtain the syntax relation structure corresponding to the joint query statement. Here, the syntax relation structure contains at least two character units in the joint query statement and the context relation between the at least two character units.

Exemplarily, in response to that the joint query statement is an SQL statement, the first electronic device may decompose a character sequence in the SQL statement into at least two independent lexical units (Token), and each lexical unit may contain data in a format of <type, value>. The at least two lexical units are classified to different types of a key word, an expression, a literal, an operator and the like respectively according to dictionaries provided by different database SQL executing engines, and thus various phrases are recognized from the at least two Tokens to serve as character units, where the character units may be types of lexical units, and may also be values of the lexical units. Here, the first electronic device uses the recognized character units as nodes, and establishes an abstract syntax tree layer by layer in a recursion manner to serve as the syntax relation structure. Here, the AST is an abstract representation of the syntax relation structure of the SQL statement in a form of a tree, nodes in the AST are in one-to-one correspondence with SQL statement contents, and an SQL statement with the same AST semantic meaning may be formed through splicing by traversing the whole AST.

In some embodiments, the first electronic device may perform lexical parsing and syntactic parsing on the joint query statement in sequence through a transformation tool (such as parsing tools of QueryParser, Druid SQL Parser, SparkSQL and the like), the obtained AST is used as the syntax relation structure corresponding to the joint query statement, and it may also be implemented by other parsing methods, which is selected according to actual conditions during actual implementation and is not limited in this embodiment of the present disclosure.

Figure 7:
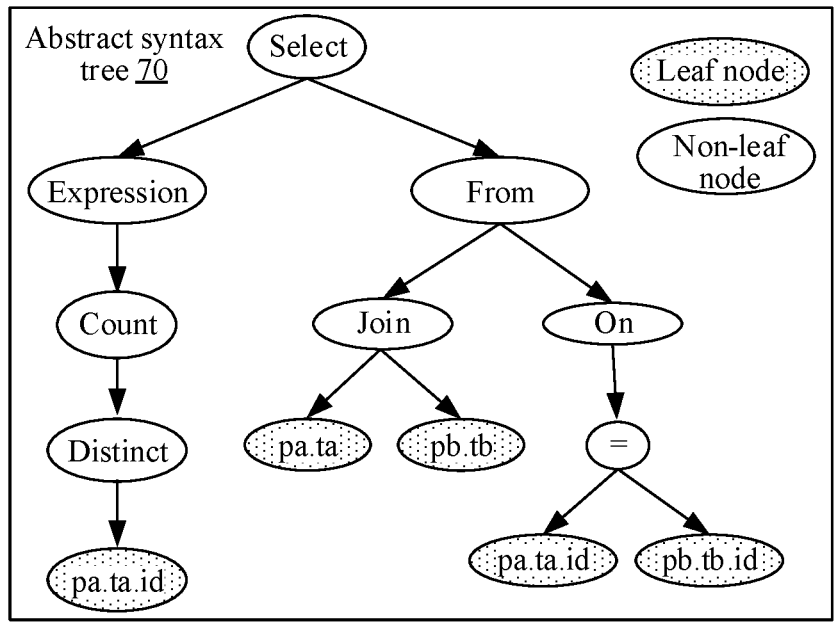
FIG. 7 is an example schematic diagram of an AST provided by an embodiment of the present disclosure.

Exemplarily, in response to that the SQL statement corresponding to the joint query statement is "Select Count (Distinct pa.ta.id) From pa.ta Join pb.tb On pa.ta.id=pb.tb.id", after the first electronic device performs lexical parsing and syntactic parsing on the joint query statement in sequence, the obtained abstract syntax tree (AST) may be an abstract syntax tree 70 shown in FIG. 7.

In this embodiment of the present disclosure, the nodes of the AST include leaf nodes and non-leaf nodes. The leaf nodes are nodes corresponding to character units in a type of a literal and may include a table name, a field name, a numerical value, a character string and the like in the joint query statement, such as pa.ta.id node, pb.tb.id node, pa.ta node and pb.tb node in FIG. 7. The non-leaf nodes may include nodes corresponding to character units in a type of a key word or a reserved character (such as an operator) in the joint query statement, such as a Select node, an Expression node, a From node, a Join node, an On node, a Count node and a Distinct node in FIG. 7.

S1012. Determine a substructure corresponding to a preset joint operational character and a preset screening key word in the at least two character units in the syntax relation structure as the joint query operator, and determine other operator partitioning results by traversing the syntax relation structure, and obtain the at least one operator containing the joint query operator based on the joint query operator and the other operator partitioning results.

In this embodiment of the present disclosure, the first electronic device may traverse the syntax relation structure according to the context relation, in a traversing process, a substructure corresponding to the preset joint operational character, the preset screening key word and the associated context relation is partitioned to be the joint query operator, so that the joint query operator is obtained based on an intersecting operational character (called a preset joint operational character) in the at least one character unit, other parts in the syntax relation structure are traversed based on a preset service rule to continue to partition the operational units till traversing of the syntax relation structure is finished, and the at least one operator containing the joint query operator is obtained.

The preset joint operational character refers to an operator for implementing a joint operation, such as Join. The preset screening key character refers to a key character associated with the preset joint operational character, such as a key character "On" representing a condition. Besides, if the other operator partitioning results indicate that other operators are determined, the joint query operator and the other operators are combined as the at least one operator. If the other operator partitioning results indicate that the other operators are not determined, the joint query operator is determined as the at least one operator.

In some embodiments, in response to that the syntax relation structure is an AST, the first electronic device uses each node in the AST as a character unit, traverses, starting with the leaf nodes in the AST, a father node of the leaf nodes and a father node of the father node, and in the traversing process, if the traversed nodes may constitute a smallest operational unit used for data operation, these nodes may be grouped as one operator. In other words, the operator is the smallest operational unit, and the operational unit includes at least one character unit used for data operation. Exemplarily, the first electronic device may traverse starting with a leaf node pa.ta.id in FIG. 7 and may determine a subtree 80 in FIG. 8 as the joint query operator when traversing the From node. The first electronic device continues to traverse other parts of the AST in the above manner till traversing for the AST is completed to obtain the at least one operator.

In some embodiments, the preset service rule represents an operational unit partitioning granularity, such as used for indicating traversing and partitioning for the syntax relation structure by using the smallest operational unit. Besides, the first electronic device may also use other operational unit partitioning granularities as the preset service rule according to actual demands, which is selected according to actual conditions during actual implementation and is not limited in this embodiment of the present disclosure.

It may be understood that in this embodiment of the present disclosure, establishment and operator partitioning of the syntax relation structure are performed on a federated data query statement to obtain the at least one operator corresponding to the joint query statement, so that secure operation may be implemented by using the at least one operator as a unit, and thus the security of the data federated analytics is improved.

Figure 9:
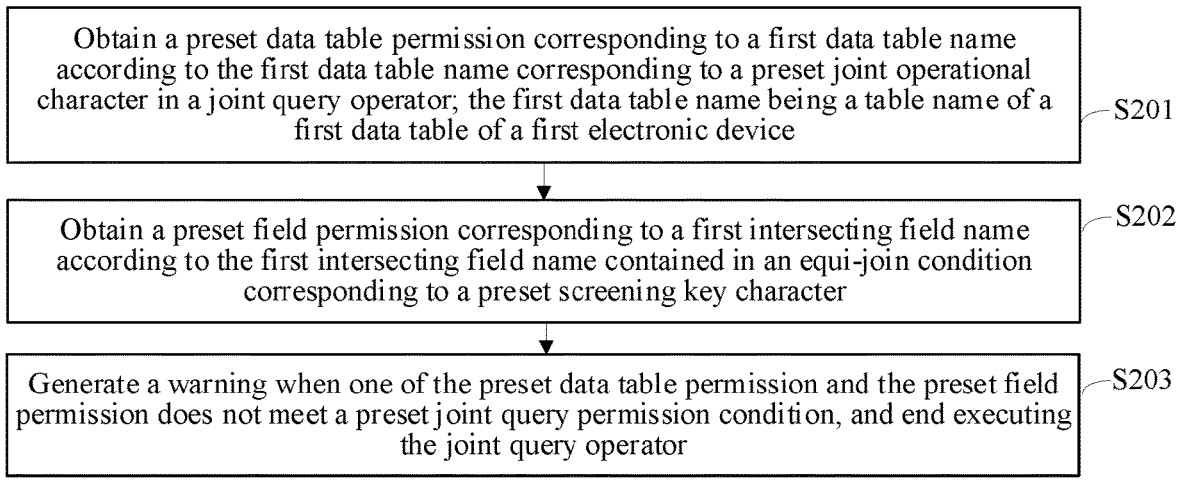
FIG. 9 is a third example schematic flowchart of a method for federated data query provided by an embodiment of the present disclosure.

In some embodiments, based on FIG. 6, in S102, after the joint query operator is obtained, the first electronic device may also execute S201 to S203, so as to perform secure computing permission analysis on the joint query operator, which will be described with reference to all steps, as shown in FIG. 9.

S201. Obtain a preset data table permission corresponding to a first data table name according to the first data table name corresponding to the preset joint operational character in the joint query operator. The first data table name is a table name of a first data table of the first electronic device.

In this embodiment of the present disclosure, the first electronic device may obtain a name of a data table object, that is, the first data table name, corresponding to the preset joint operational character on the first electronic device according to the preset joint operational character in the joint query operator.

Figure 8:
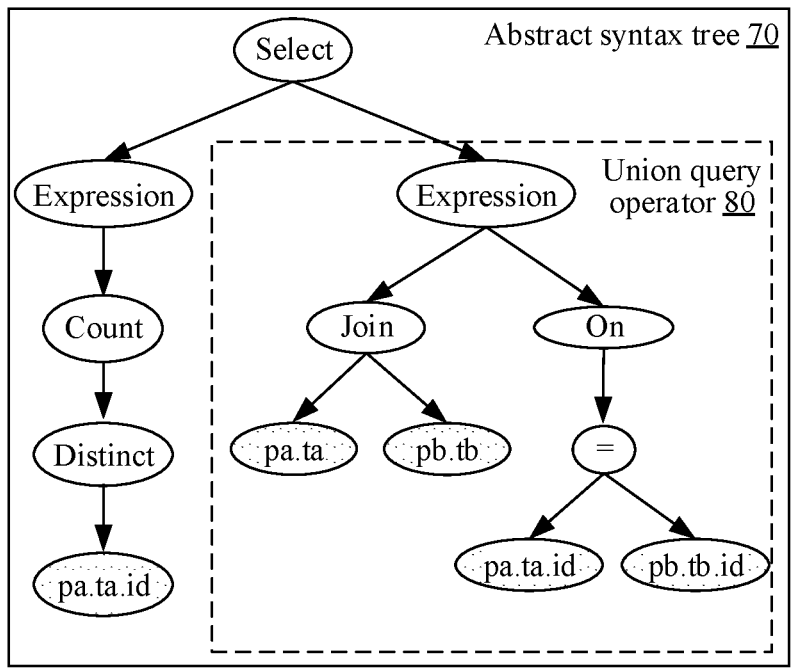
FIG. 8 is another example schematic diagram of an AST provided by an embodiment of the present disclosure.

In some embodiments, as for the joint query operator 80 shown in FIG. 8, the first electronic device may obtain a data table name, such as pa.ta, corresponding to a Join operational character on the first electronic device through the preset joint operational character Join to serve as the first data table name.

In this embodiment of the present disclosure, the first electronic device may register a data table and a preset operation permission of all records in the data table in a preset metadatabase in advance. Exemplarily, corresponding preset operation permissions (such as accessible to a data table, accessible to a data field, capable of implementing the joint query operation and the like) are configured in the preset metadatabase respectively according to the table name, a field name of each field, a column name or the like of the first data table. Here, the preset metadatabase may be a database on a third party device, and may also be deployed in any position with a permission to access of the first electronic device, which is selected according to actual conditions during actual implementation and is not limited in this embodiment of the present disclosure.

In this embodiment of the present disclosure, the first electronic device may obtain a preset data table permission corresponding to the first data table name from the preset metadatabase, and the preset data table permission represents a permission to operating the first data table name.

S202. Obtain a preset field permission corresponding to a first intersecting field name according to the first intersecting field name contained in an equi-join condition corresponding to the preset screening key character.

In this embodiment of the present disclosure, the first electronic device may obtain an intersecting field name, that is, the first intersecting field name, under the first data table name contained in the equi-join condition according to the equi-join condition corresponding to the preset screening key word in the joint query operator.

In some embodiments, as for the joint query operator 80 shown in FIG. 8, the first electronic device may obtain an intersecting field name pa.ta.id under a first data table name pa.ta contained in an equi-join condition "pa.ta.id=pb.tb.id" corresponding to a preset screening key character On through the preset screening key character On and uses the pa.ta.id as the first intersecting field name.

In this embodiment of the present disclosure, the first electronic device may obtain the preset field permission corresponding to the first intersecting field name from the present metadatabase, and the preset field permission indicates a permission to operating the first intersecting field name.

S203. Generate a warning in response to that one of the preset data table permission and the preset field permission does not meet a preset joint query permission condition, and end executing the joint query operator.

In this embodiment of the present disclosure, the first electronic device may perform permission verifying on the operation of the joint query operator according to the preset data table permission and the preset field permission, warn to refuse executing the joint query operator in response to that any one of the preset data table permission and the preset field permission does not meet the preset joint query permission condition, that is, in response to that a data content corresponding to the first data table name or the first intersecting field name to be operated by the joint query operator is not allowed to participate in the federated data query operation, and stop secure transformation and subsequent executing operation for the joint query operator. The preset joint query permission condition being not met means that the first electronic device does not have a permission to a corresponding operation. The preset joint query permission condition being met means that the first electronic device has the permission to the corresponding operation.

In some embodiments, the first electronic device may perform permission protection on some fields where privacy data such as detail data are recorded and forbid the privacy data from participating in the federated data query and allow intermediate data, such as aggregated data generated after gathering, generated from the detail data by computing to participate in the federated data query, so that the preset joint query permission is set, and privacy protection of the data content in the first electronic device is implemented. Therefore, when the first electronic device executes the joint query operator according to the preset data table permission and the preset field permission, as for some joint query operators which possibly cause leakage of privacy data, such as a single-column Select for initiating a query for details of a certain data column, the first electronic device may initiate warning in time according to a preset joint query permission to refuse executing the joint query operation which possibly causes data leakage so as to improve the security of the federated data query.

In this embodiment of the present disclosure, after S202, the first electronic device may be further configured to transform the joint query operator to the first joint security operator based on the preset security protocol only in response to that both the preset data table permission and the preset field permission meet the preset joint query permission condition.

It may be understood that in this embodiment of the present disclosure, by verifying a permission operation for the joint query operator, an initiator of the federated data query may be prevented from accessing to unauthorized data, so that privacy of the participants in the federated data query is protected and the security of the federated data query is improved.

In some embodiments, in S101, after the syntax relation structure is obtained, the first electronic device may further optimize the syntax relation structure according to a preset optimizing strategy to obtain a target syntax relation structure, the target syntax relation structure containing at least two target character units corresponding to the joint query statement and a context relation between the at least two target character units; where the target syntax relation structure is an optimized syntax relation structure; and determine a substructure corresponding to a preset joint operational character and a preset screening key character in the at least two target character units in the target syntax relation structure as the joint query operator.

In some embodiments, after the first electronic device, in the syntax relation structure, determines the substructure corresponding to the preset joint operational character and the preset screening key character in the at least two character units as the joint query operator, the method further includes: optimizing, by the first electronic device, the joint query operator through the preset optimizing strategy to obtain the target joint query operator. In this way, targeted optimizing for the joint query operator is implemented, and joint query efficiency is improved. Correspondingly, the transforming, by the first electronic device, the joint query operator to the first joint security operator based on the preset security protocol includes: transforming, by the first electronic device, the target joint query operator to the first joint security operator based on the preset security protocol.

As the joint query operator involves secure joint computing of corresponding various data of a plurality of participants, an encryption and decryption operation may be involved (such as homomorphic encryption), and compared with plain text data processing, needed time consumption of computing is usually longer, and computing cost is higher. Therefore, the first electronic device may also perform targeted optimizing on the joint query operator. Here, the preset optimizing strategy may include a cost-based optimizing strategy, such as at least one of column pruning, predicate pushdown or constant folding, which is selected according to actual conditions during actual implementation and is not limited in this embodiment of the present disclosure.

In this embodiment of the present disclosure, the joint query statement may also be optimized. Exemplarily, as for an SQL statement "SELECT count(distinct t1.suin) cnt FROM db_ieg::t_game_login_detail partition (p_0101) t1 JOIN db_wxg::t_red_dot_click_detail partition (p_0101) t2 ON t1.suin=t2.commid" used for statistically calculating the quantity of logging in a game account by clicking a red dot on a date of 0101, where t1 represents a data table for storing login details of a game, and t2 represents a data table for storing a click situation of a game red dot, the first electronic device may obtain an optimized SQL statement "SELECT COUNT(DISTINCT partya.table.id) FROM partya.tablea JOIN partyb.tableb ON partya.tablea.id partyb.tableb.id" in an optimizing manner of column pruning.

It may be understood that in this embodiment of the present disclosure, by optimizing the syntax relation structure, a processing flow of the federated data query may be simplified, and the efficiency of the federated data query is improved.

Figure 10:
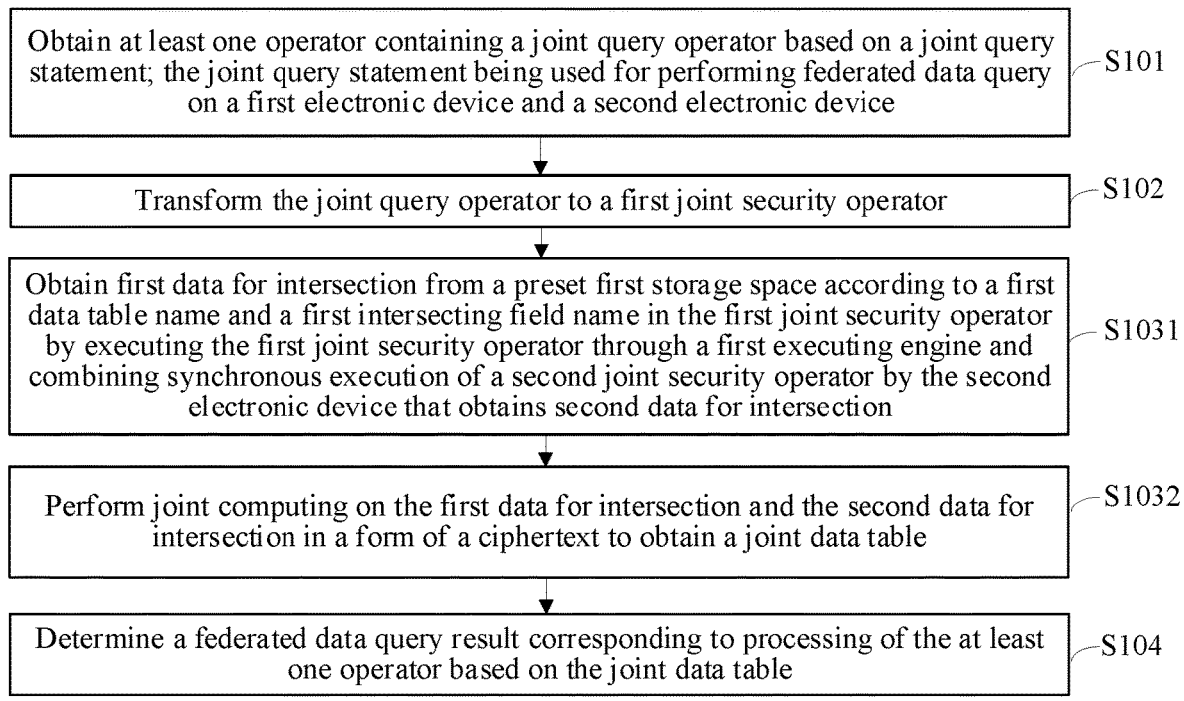
FIG. 10 is a fourth example schematic flowchart of a method for federated data query provided by an embodiment of the present disclosure.

In some embodiments, based on FIG. 5, FIG. 6 or FIG. 9, S103 may be implemented through S1031 to S1032, which will be described with reference to all steps, as shown in FIG. 10.

S1031. Obtain the first data for intersection from a preset first storage space according to a first data table name and a first intersecting field name in the first joint security operator by executing the first joint security operator through a first executing engine and combining synchronous execution for the second joint security operator by the second electronic device that obtains second data for intersection.

In this embodiment of the present disclosure, the first electronic device may determine a first data table corresponding to the first data table name from the corresponding first preset first storage space of the first electronic device and obtain a field record corresponding to the first intersecting field name from the first data table according to the first data table name and the first intersecting field name in the first joint security operator to serve as the first data for intersection.

Exemplarily, the first data table userdata1 may be shown in Table 4 and includes a field content corresponding to a field User_ID and a field content corresponding to a field User_Name.

TABLE 4

| User_ID | User_Name |
| --- | --- |
| 1 | Name A |
| 2 | Name B |
| 3 | Name C |
| 4 | Name D |

In response to that in the first joint security operator, the first data table name is userdata1 and the first intersecting field name is User_ID, the first data for intersection obtained by the first electronic device are shown in Table 5 and include a field content corresponding to the field User_ID.

TABLE 5

| User_ID |
|---|
| 1 |
| 2 |
| 3 |
| 4 |

S1032. Perform joint computing on the first data for intersection and the determined second data for intersection on the second electronic device in a form of a ciphertext to obtain the joint data table.

In this embodiment of the present disclosure, the first electronic device may run the first joint security operator through the first executing engine and synchronously run the second joint security operator through the second electronic device so as to perform data encrypted transmission and intersecting computing on the first data for intersection and the second data for intersection in sequence through synchronous execution of the first joint security operator and the second joint security operator, that is, data interaction and joint computing are performed on its own first data for intersection and the second data for intersection of the second electronic device in a form of a ciphertext in sequence to obtain the joint data table.

In some embodiments, in response to that the preset security protocol is a PSI protocol, the first electronic device may encrypt the first data for intersection by using a public key of the PSI protocol by executing the first joint security operator to obtain first intermediate encrypted data; and transmit the first intermediate encrypted data to the second electronic device so that the second electronic device encrypt the first intermediate encrypted data by using the public key of the PSI protocol through the second joint security operator to obtain first encrypted data; in addition, the first electronic device may receive the first encrypted data transmitted by the second electronic device and second intermediate encrypted data obtained by encrypting the second data for intersection by the second electronic device through the second joint security operator; and encrypt the second intermediate encrypted data through the first joint security operator to obtain second encrypted data; and thus, the first electronic device may perform intersecting computing on the first encrypted data and the second encrypted data in the form of the ciphertext to obtain the joint data table. Exemplarily, the first electronic device computes at least one same record in the first encrypted data and the second encrypted data and uses an equivalent mapping relationship of the at least one same record as the joint data table.

Figure 11:
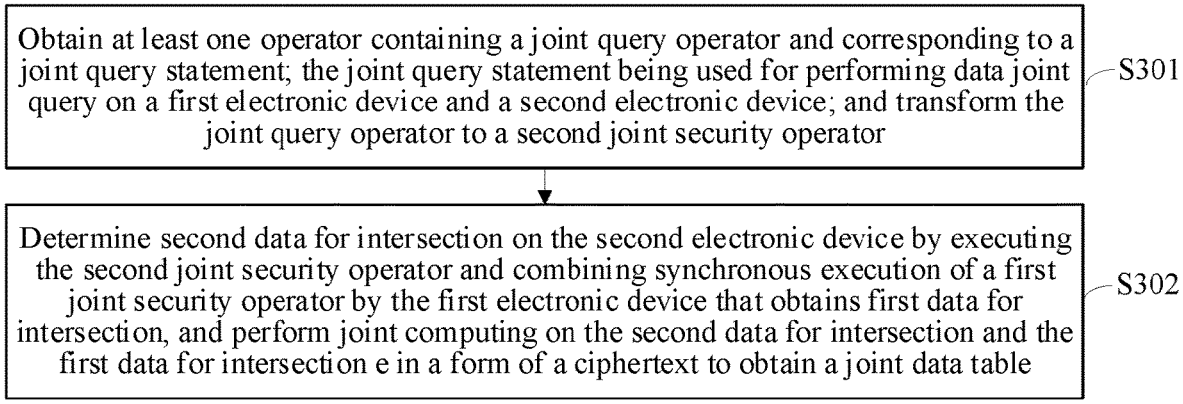
FIG. 11 is a fifth example schematic flowchart of a method for federated data query provided by an embodiment of the present disclosure.

A method for federated data query provided by an embodiment of the present disclosure will be described with reference to an exemplary application and implementation of being applied to a second electronic device, that is, a terminal 400-2, provided by an embodiment of the present disclosure. Referring to FIG. 11, FIG. 11 is a fifth example schematic flowchart of a method for federated data query provided by an embodiment of the present disclosure. Description will be made with reference to steps shown in FIG. 11.

S301. Obtain at least one operator containing a joint query operator and corresponding to a joint query statement; the joint query statement being used for performing federated data query on a first electronic device and the second electronic device; and transform the joint query operator to a second joint security operator.

In this embodiment of the present disclosure, in a case of receiving the joint query statement, the second electronic device performs parsing processing and transformation on the received joint query statement in sequence based on a preset security protocol, and a process of obtaining the second joint security operator is consistent with a description of a processing process in S101 to S102, which is not repeated here. Besides, the second electronic device may further obtain at least one operator containing the joint query operator by receiving the at least one operator containing the joint query operator transmitted by the first electronic device.

S302. Determine second data for intersection on the second electronic device by executing the second joint security operator, where synchronous execution of a first joint security operator is performed by the first electronic device to obtain first data for intersection, and perform joint computing on the second data for intersection and the first data for intersection in a form of a ciphertext to obtain a joint data table.

In this embodiment of the present disclosure, the second electronic device may obtain the second data for intersection from its own corresponding preset second storage space according to a second data table name and a second intersecting field name in the second joint security operator.

Exemplarily, a second data table userdata2 may be shown in Table 6 and includes a field content corresponding to a field User_ID and a field content corresponding to a field User_Name.

TABLE 6

| User_ID | User_Name |
|---|---|
| 2 | Name B |
| 3 | Name C |
| 5 | Name E |
| 6 | Name F |

In response to that in the second joint security operator, the second data table name is userdata2 and the second intersecting field name is User_ID, the second data for intersection obtained by the second electronic device are shown in Table. 7 and include a field content corresponding to a field User_ID.

TABLE 7

| User_ID |
|---|
| 2 |
| 3 |
| 5 |
| 6 |

In this embodiment of the present disclosure, the second electronic device may execute the second joint security operator through a second executing engine and perform data encrypted transmission and intersecting computing on the first data for intersection and the second data for intersection in sequence by combining synchronous execution for the first joint security operator by the first electronic device to obtain the joint data table.

Figure 12:
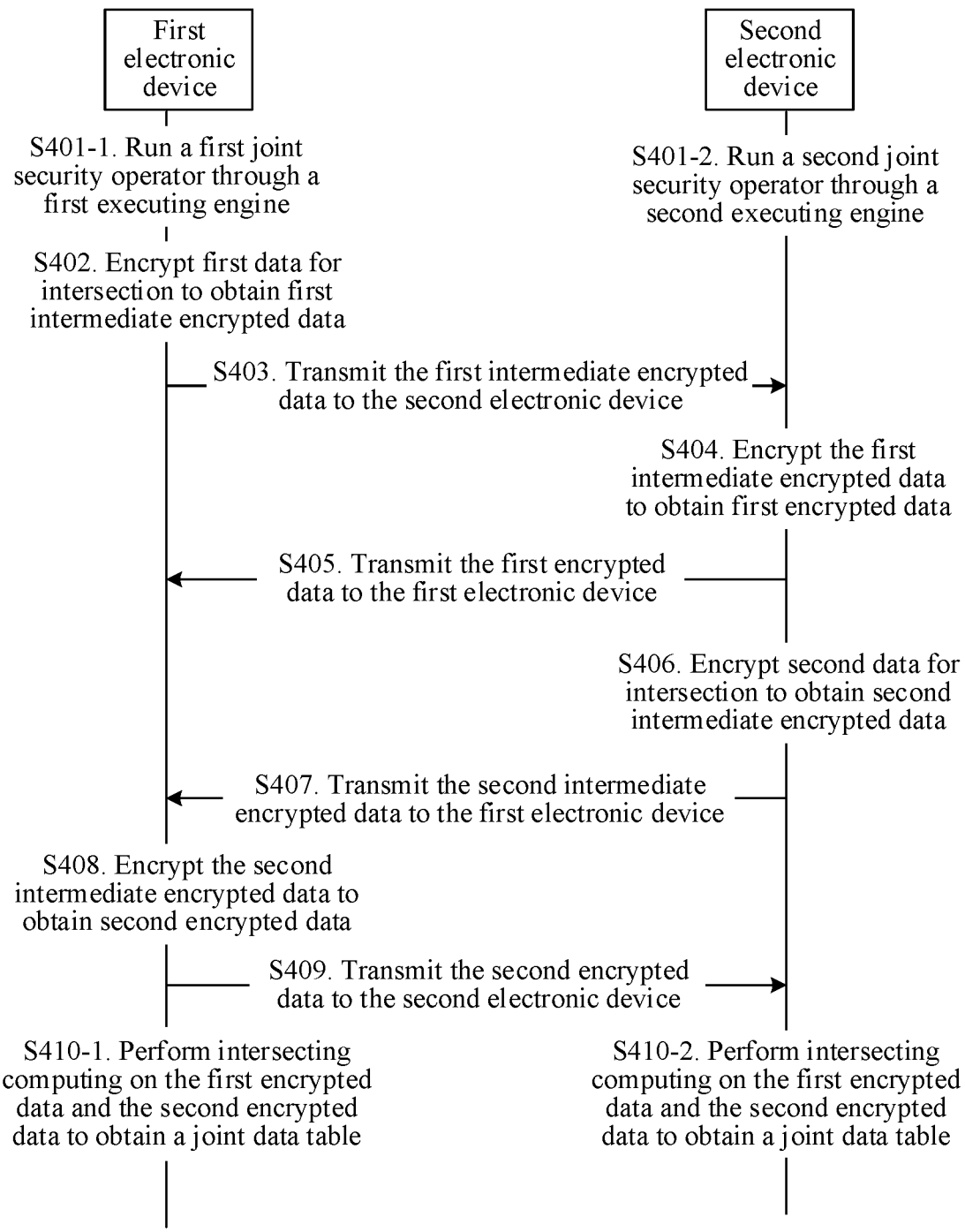
FIG. 12 is an example schematic interaction flowchart of a method for federated data query provided by an embodiment of the present disclosure.

In some embodiments, in response to that the first joint security operator and the second joint security operator are PSI operators implemented based on a PSI protocol, by combining the above executing process of the first electronic device, a process of performing the ciphertext data interaction and intersecting computing in sequence by combining the execution for the first joint security operator by the first electronic device and the execution for the second joint security operator by the second electronic device may be shown in FIG. 12.

S401-1. Run, by the first electronic device, the first joint security operator through the first executing engine.

S401-2. Run, by the second electronic device, the second joint security operator through the second executing engine.

In this embodiment of the present disclosure, S401-1 and S401-2 are executed synchronously.

S402. Encrypt, by the first electronic device, the first data for intersection to obtain first intermediate encrypted data.

S403. Transmit, by the first electronic device, the first intermediate encrypted data to the second electronic device.

S404. Encrypt, by the second electronic device, the first intermediate encrypted data to obtain first encrypted data.

S405. Transmit, by the second electronic device, the first encrypted data to the first electronic device.

S406. Encrypt, by the second electronic device, the second data for intersection to obtain second intermediate encrypted data.

S407. Transmit, by the second electronic device, the second intermediate encrypted data to the first electronic device.

Here, S406 may be executed after S401-2 and before S407, exemplarily, S406 may be executed synchronously with S402, or executed after S404 or S405, which is not limited in this embodiment of the present disclosure.

S408. Encrypt, by the first electronic device, the second intermediate encrypted data to obtain second encrypted data.

In this embodiment of the present disclosure, in response to that the first electronic device of one party obtains the joint data table through computing, after S408, S410-1 may be executed directly.

S409. Transmit, by the first electronic device, the second encrypted data to the second electronic device.

S410-1. Perform, by the first electronic device, intersecting computing on the first encrypted data and the second encrypted data to obtain the joint data table.

S410-2. Perform, by the second electronic device, intersecting computing on the first encrypted data and the second encrypted data to obtain the joint data table.

In this embodiment of the present disclosure, in response to that the second electronic device of one party obtains the joint data table through computing, after S408, S410-2 may be executed directly. In response to that the first electronic device and the second electronic device obtain the joint data table at the same time, S410-1 and S410-2 may be executed.

In some embodiments, based on the above Table 5 and Table 7, the joint data table may contain an equivalent mapping relationship that User_ID2 and 3 in userdata1 and User_ID2 and 3 in userdata2 are the same data record, so that the first electronic device or the second electronic device may perform data federated analytics based on the above equivalent mapping relationship to complete the federated data query.

It may be understood that in this embodiment of the present disclosure, the joint security operator is established through the PSI protocol, it is ensured strictly through security of PSI that plain text data of a data table of any party of the first electronic device and the second electronic device are not disclosed, so that the security of the federated data query is improved.

Exemplary applications of this embodiment of the present disclosure in some actual scenarios will be introduced below with reference to FIG. 13.

In some embodiments, the method for federated data query provided by this embodiment of the present disclosure may be applied to computing an actual recommendation effect of an advertisement. Exemplarily, an online advertisement is an important advertisement form. A common method for measuring effectiveness of an advertisement is to compute a transformation rate, that is, how many users among users browsing the advertisement browse a corresponding goods page finally or purchase corresponding goods or services finally. Therefore, through the method for federated data query provided by this embodiment of the present disclosure, an intersection (such as computing a total value of transactions or a total amount of transactions, called a federated data query result) of information (possessed by an advertisement launcher and called the first data for intersection) of users browsing the advertisement and information (possessed by a merchant and called the second data for intersection) of users finishing a corresponding transaction may be computed, meanwhile, privacy of user information of the both parties is guaranteed, and a situation that information of one party is exposed to the other party, and privacy disclosure of the users and the merchant or an advertiser is caused is avoided.

In some embodiments, the method for federated data query provided by this embodiment of the present disclosure may be applied to a scenario of looking for a contact person. Exemplarily, when one user registers and uses new communication software B, a contact person that has registered the communication software B may be looked for among contact persons of existing communication software A of the user, and through the method for federated data query provided by this embodiment of the present disclosure, the contact person of the communication software A may be safely transmitted to a service provider of the communication software B to implement secure import of the contact person. Related data of the contact person of the communication software A are possessed by the communication software A, and registration data of the communication software B are possessed by the communication software B.

In the above application scenario, in response to that a joint query SQL statement used for performing advertisement effect analysis or contact person import is received, the first electronic device may compile (called lexical parsing and syntactic parsing) the SQL statement by using a syntax parser or a secure joint computing compiler, and transform the SQL statement to an abstract syntax tree shown in FIG. 7. The first electronic device performs a permission analysis on the obtained AST. As for a query operation conforming to a syntax rule, the secure joint query SQL statement is subjected to minimum functional partitioning. On implementation of a lower-layer computing protocol, the AST is transformed to a secure computing operator according to the PSI protocol to obtain the joint security operator to be distributed to an executing engine in a form of an atomic task for performing executing of a distributed plan. In a plan executing process, a PSI operator corresponds to a From subtree (a tree using a From node as a root node) in the AST, and a Distinct operator and a Count operator corresponds to a Distinct node and a Count node in the AST in sequence. When traversing the From node, participant objects in the federated data query are obtained through a Join node and an On node respectively, such as input tables "pa.ta" and "pb.tb" corresponding to the participant object pa and the participant object pb in sequence, and an equi-join condition "=", where the equi-join condition is represented as "pa.ta.id=pb.tb.id".

Figure 13:
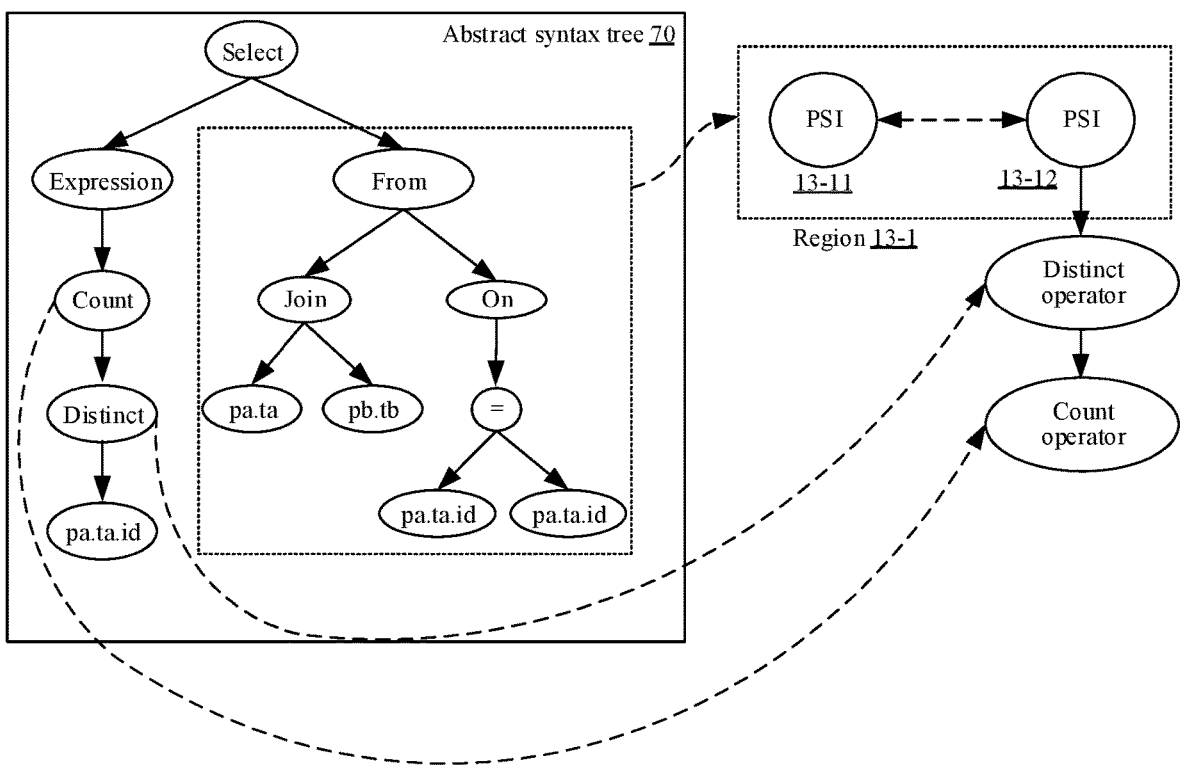
FIG. 13 is an example schematic flowchart of a method for federated data query in an actual application scenario provided by an embodiment of the present disclosure.

As shown in FIG. 13, PSI tasks occur pairwise to the participant object pa and the participant object pb, as shown by a region 13-1 in FIG. 13, PSI 13-11 belongs to the participant object pa, and PSI 13-12 belongs to the participant object pb. Parameters of the PSI tasks include a data table and an intersecting field. Therefore, as for the PSI task of the participant object pa, the data table to is "pa.ta", and an id field of the intersecting field is "pa.ta.id"; and as for the PSI task of the participant object pb, the data table tb is "pb.tb", and an id field of the intersecting field is "pb.tb.id". The PSI tasks, after being configured with parameters, of the participant object pa and the participant object pb are started at the same time. When the tasks are finished, a content corresponding to "pa.ta.id=pb.tb.id" of the participant object pa and the participant object pb may be obtained, and their own private contents are not disclosed.

An exemplary structure of an apparatus for federated data query being implemented as a software module provided by this embodiment of the present disclosure continues to be described below. In some embodiments, as shown in FIG. 3, a software module in a first apparatus 455-1 for federated data query stored in a memory 450-1 may include: a first parsing processing module 4551-1, a first transforming module 4552-1, a first computing module 4553-1 and a processing module 4554.

The first parsing processing module 4551-1 is configured to obtain at least one operator containing a joint query operator based on a joint query statement, the joint query statement being used for performing federated data query on a first electronic device and a second electronic device;

the first transforming module 4552-1 is configured to transform the joint query operator to a first joint security operator;

the first computing module 4553-1 is configured to determine first data for intersection on the first electronic device by executing the first joint security operator and combining synchronous execution of a second joint security operator by the second electronic device that obtains second data for intersection, and perform joint computing on the first data for intersection and the second data for intersection in a form of a ciphertext to obtain a joint data table; and the processing module 4554 is configured to determine a federated data query result corresponding to the at least one operator based on the joint data table.

In some embodiments, the first parsing processing module 4551-1 is configured to parse the joint query statement in sequence to obtain a syntax relation structure corresponding to the joint query statement, the syntax relation structure containing at least two character units corresponding to the joint query statement and a context relation between the at least two character units; determine a substructure corresponding to a preset joint operational character and a preset screening key character in the at least two character units in the syntax relation structure as the joint query operator, and determine other operator partitioning results by traversing the syntax relation structure; and obtain the at least one operator containing the joint query operator based on the joint query operator and the other operator partitioning results.

In some embodiments, the first computing module 4553-1 is configured to obtain a preset data table permission corresponding to a first data table name according to the first data table name corresponding to the preset joint operational character in the joint query operator, the first data table name being a table name of a first data table of the first electronic device; and obtain a preset field permission corresponding to a first intersecting field name according to the first intersecting field name contained in an equi-join condition corresponding to the preset screening key character.

In some embodiments, the first apparatus 455-1 for federated data query further includes a permission verification module. The permission verification module is configured to warn in response to that any one of the preset data table permission and the preset field permission does not meet a preset joint query permission condition and end executing the joint query operator.

In some embodiments, the first apparatus 455-1 for federated data query further includes an optimizing module. The optimizing module is configured to optimize the syntax relation structure according to a preset optimizing strategy to obtain a target syntax relation structure. The preset optimizing strategy includes: at least one of column pruning, predicate pushdown or constant folding. The target syntax relation structure contains at least two target character units corresponding to the joint query statement and a context relation between the at least two target character units.

In some embodiments, the first parsing processing module 4551-1 is further configured to determine a substructure corresponding to the preset joint operational character and the preset screening key character in the at least two target character units in the target syntax relation structure as the joint query operator.

In some embodiments, the optimizing module is further configured to optimize the joint query operator through the preset optimizing strategy to obtain the target joint query operator.

In some embodiments, the first transforming module 4552-1 is further configured to transform the target joint query operator to the first joint security operator.

In some embodiments, the first computing module 4553-1 is further configured to obtain the first data for intersection from a preset first storage space according to the first data table name and the first intersecting field name in the first joint security operator by executing the first joint security operator through a first executing engine and combining synchronous execution of the second joint security operator by the second electronic device that obtains second data for intersection, and perform joint computing on the first data for intersection and the second data for intersection in a form of a ciphertext to obtain the joint data table.

In some embodiments, the first computing module 4553-1 is further configured to encrypt the first data for intersection to obtain first intermediate encrypted data and transmit the first intermediate encrypted data to the second electronic device, the second electronic device being configured to encrypt the first intermediate encrypted data by executing the second joint security operator to obtain first encrypted data; encrypt second intermediate encrypted data transmitted by the second electronic device to obtain second encrypted data and transmit the second encrypted data to the second electronic device, the second intermediate encrypted data being encrypted data obtained by encrypting the determined second data for intersection on the second electronic device by the second electronic device by executing the second joint security operator; and perform intersecting computing on the first encrypted data transmitted by the second electronic device and the second encrypted data to obtain the joint data table, the joint computing including the intersecting computing.

In some embodiments, the first transforming module 4552-1 is further configured to transform the joint query operator to the first joint security operator in response to that both the preset data table permission and the preset field permission meet the preset joint query permission condition.

In some embodiments, as shown in FIG. 4, a software module in a second apparatus 455-2 for federated data query stored in a memory 450-2 may include the following software modules: a second parsing processing module 4551-2, a second transforming module 4552-2 and a second computing module 4553-2.

The second parsing processing module 4551-2 is configured to obtain at least one operator containing a joint query operator and corresponding to a joint query statement; the joint query statement being used for performing federated data query on a first electronic device and a second electronic device;

the second transforming module 4552-2 is configured to transform the joint query operator to a second joint security operator; and the second computing module 4553-2 is configured to determine second data for intersection on the second electronic device by executing the second joint security operator and combining synchronous execution of a first joint security operator by the first electronic device that obtains first data for intersection, and perform joint computing on the second data for intersection and the first data for intersection in a form of a ciphertext to obtain a joint data table.

In some embodiments, the second computing module 4553-2 is further configured to obtain the second data for intersection from a preset second storage space according to a second data table name and a second intersecting field name in the second joint security operator by executing the second joint security operator through a second executing engine and combining synchronous execution of the first joint security operator by the first electronic device that obtains first data for intersection, and perform joint computing on the first data for intersection and the second data for intersection in a form of a ciphertext to obtain the joint data table.

In some embodiments, the second computing module 4553-2 is further configured to encrypt first intermediate encrypted data transmitted by a first electronic device to obtain first encrypted data and transmit the first encrypted data to the first electronic device, the first intermediate encrypted data being encrypted data obtained by encrypting the determined first data for intersection on the first electronic device by the first electronic device by executing the first joint security operator; encrypt the second data for intersection to obtain second intermediate encrypted data, and transmit the second intermediate encrypted data to the first electronic device, the first electronic device being configured to encrypt the second intermediate encrypted data through the first joint security operator to obtain second encrypted data; and perform intersecting computing on the first encrypted data and the second encrypted data transmitted by the first electronic device to obtain a joint data table, the joint computing including the intersecting computing.

The above description of the apparatus embodiments is similar to the above description of the method embodiments, and has beneficial effects similar to the method embodiments. Refer to descriptions in the method embodiments of the present disclosure for technical details undisclosed in the apparatus embodiments of the present disclosure.

An embodiment of the present disclosure provides a computer program product, the computer program product including a computer program or an executable instruction, and in response to that the computer program or the executable instruction is run on an electronic device, the electronic device executing the methods for federated data query in the embodiments of the present disclosure.

An embodiment of the present disclosure provides a computer-readable storage medium storing an executable instruction, the executable instruction being stored therein and causing, when executed by a processor, the processor to execute the method for federated data query provided by the embodiments of the present disclosure, for example, the methods for federated data query shown in FIGS. 5, 6, 9, 10 and 11.

In some embodiments, the computer-readable storage medium may be an FRAM, a ROM, a PROM, an EPROM, an EEPROM, a flash memory, a magnetic surface memory, an optical disk, a CD-ROM or other memories; and may also be various devices including one or any combination of the above memories.

In some embodiments, the executable instruction may be compiled according to a programming language in any form (including a compiled or interpretive language, or declarative or procedural language) by using a form of a program, software, a software module, a script or a code, and may be deployed in any form, including being deployed a stand-alone program or being deployed a module, a component, a subroutine or other units suitable for being used in a computing environment.

As an example, the executable instruction may but not necessarily correspond to a file in a file system, and may be stored in a part of a file saving other programs or data, for example, stored in one or more scripts in a hyper text markup language (HTML) document, stored in a single file special for discussed programs, or stored in a plurality of collaborative files (for example, a file storing one or more modules, a subprogram or a code part).

As an example, the executable instruction may be deployed to be executed on an electronic device, or executed on a plurality of electronic devices located in one place, or executed on a plurality of electronic devices distributed in a plurality of places and interconnected through a communication network.

It may be understood that in the embodiments of the present disclosure, as for involved related data, when the embodiments of the present disclosure are applied to a specific product or technology, user permission or consent needs to be obtained, and collection, use and processing of the related data need to conform to related laws and regulations and standards in a related country and region.

To sum up, in the embodiments of the present disclosure, by parsing the joint query statement, the joint query operator is separated out from the joint query statement, the joint query operator is transformed to the first joint security operator, secure ciphertext transmission and computing are performed in sequence by combining execution for the second joint security operator by the second electronic device, a decentralized distributed computing process is implemented, analysis for data of the counterparts can be implemented on one's own device, data privacy of all participants in the data federated analytics is protected at the same time in a manner of encrypted transmission and computing, and thus the security of the federated data query can be improved. Besides, by verifying the permission operation of the joint query operator, the initiator of the federated data query may be prevented from accessing to unauthorized data, so that privacy of the participants in the federated data query is protected, and the security of the federated data query is improved.

The above description is only embodiments of the present disclosure instead of being used for limiting the protection scope of the present disclosure. Any modification, equivalent replacement, and improvement made within the spirit and scope of the present disclosure fall within the protection scope of the present disclosure.

What is claimed is:

1. A method for federated data query, executed by a first electronic device and comprising:
   using, by the first electronic device, a joint query statement corresponding to a federated data query to obtain at least one operator containing a joint query operator, comprising:
      parsing the joint query statement to obtain a syntax relation structure; and
      determining, according to the syntax relation structure, a substructure corresponding to a preset joint operational character and a preset screening key character as the joint query operator;
   obtaining, from a preset metadatabase containing operation permissions of records of data tables previously registered by the first electronic device, a preset data table permission corresponding to a first data table name according to the first data table name corresponding to the preset joint operational character in the joint query operator; the first data table name being a table name of a first data table of the first electronic device, and the preset data table permission indicating whether data content corresponding to the first data table name is allowed to participate in federated data queries;
   obtaining, from the preset metadatabase, a preset field permission corresponding to a first intersecting field name according to the first intersecting field name contained in an equi-join condition corresponding to the preset screening key character, the preset field permission indicating whether data content corresponding to the first intersecting field name is allowed to participate in federated data queries;
   in response to that at least one of the preset data table permission or the preset field permission does not meet a preset joint query permission condition, generating a warning and ending execution of the joint query operator;
   in response to that both the preset data table permission and the preset field permission meet the preset joint query permission condition, transforming the joint query operator to a first joint security operator;
   determining first data for intersection on the first electronic device by executing the first joint security operator;
   receiving second data for intersection from a second electronic device involved in the federated data query;
   performing joint computing on the first data for intersection and the second data for intersection in a form of a ciphertext to obtain a joint data table; and
   determining a federated data query result corresponding to the at least one operator based on the joint data table.

2. The method according to claim 1, wherein the syntax relation structure containing at least two character units corresponding to the joint query statement and a context relation between the at least two character units, and the using a joint query statement corresponding to a federated data query to obtain at least one operator containing a joint query operator comprises:
   determining the substructure corresponding to the preset joint operational character and the preset screening key character in the at least two character units in the syntax relation structure as the joint query operator, and determining other operator partitioning results by traversing the syntax relation structure; and
   obtaining the at least one operator containing the joint query operator based on the joint query operator and the other operator partitioning results.

3. The method according to claim 1, further comprising:
   optimizing the syntax relation structure according to a preset optimizing strategy to obtain a target syntax relation structure; wherein the preset optimizing strategy comprises at least one of: column pruning, predicate pushdown or constant folding, and the target syntax relation structure contains at least two target character units corresponding to the joint query statement and a context relation between the at least two target character units; and
   determining the substructure corresponding to the preset joint operational character and the preset screening key character in the at least two target character units in the target syntax relation structure as the joint query operator.

4. The method according to claim 1, further comprising:
   optimizing the joint query operator through a preset optimizing strategy to obtain a target joint query operator; and
   the transforming the joint query operator to a first joint security operator comprises:
      transforming the target joint query operator to the first joint security operator.

5. The method according to claim 1, wherein the determining first data for intersection on the first electronic device by executing the first joint security operator comprises:
   obtaining the first data for intersection from a preset first storage space according to a first data table name and a first intersecting field name in the first joint security operator by executing the first joint security operator through a first executing engine.

6. The method according to claim 1, wherein the performing joint computing on the first data for intersection and the second data for intersection in a form of a ciphertext to obtain a joint data table comprises:
   encrypting the first data for intersection to obtain first intermediate encrypted data, transmitting the first intermediate encrypted data to the second electronic device, the second electronic device being configured to encrypt the first intermediate encrypted data by executing the second joint security operator to obtain first encrypted data;
   encrypting second intermediate encrypted data transmitted by the second electronic device to obtain second encrypted data and transmitting the second encrypted data to the second electronic device; the second intermediate encrypted data being obtained by encrypting the second data for intersection, and the second data for intersection being determined by the second electronic device by executing the second joint security operator; and
   performing intersecting computing on the first encrypted data transmitted by the second electronic device and the second encrypted data to obtain the joint data table, the joint computing comprising the intersecting computing.

7. A first electronic device, comprising:
   at least one first memory, configured to store an executable instruction; and at least one first processor, configured, when executing the executable instruction stored in the at least one first memory, to perform:

using a joint query statement corresponding to a federated data query to obtain at least one operator containing a joint query operator, comprising:
  parsing the joint query statement to obtain a syntax relation structure; and
  determining, according to the syntax relation structure, a substructure corresponding to a preset joint operational character and a preset screening key character as the joint query operator;
obtaining, from a preset metadatabase containing operation permissions of records of data tables previously registered by the first electronic device, a preset data table permission corresponding to a first data table name according to the first data table name corresponding to the preset joint operational character in the joint query operator; the first data table name being a table name of a first data table of the first electronic device, and the preset data table permission indicating whether data content corresponding to the first data table name is allowed to participate in federated data queries;
obtaining, from the preset metadatabase, a preset field permission corresponding to a first intersecting field name according to the first intersecting field name contained in an equi-join condition corresponding to the preset screening key character, the preset field permission indicating whether data content corresponding to the first intersecting field name is allowed to participate in federated data queries;
in response to that at least one of the preset data table permission or the preset field permission does not meet a preset joint query permission condition, generating a warning and ending execution of the joint query operator;
in response to that both the preset data table permission and the preset field permission meet the preset joint query permission condition, transforming the joint query operator to a first joint security operator;
determining first data for intersection on the first electronic device by executing the first joint security operator;
receiving second data for intersection from a second electronic device involved in the federated data query;
performing joint computing on the first data for intersection and the second data for intersection in a form of a ciphertext to obtain a joint data table; and
determining a federated data query result corresponding to the at least one operator based on the joint data table.

8. The device according to claim 7, wherein the syntax relation structure containing at least two character units corresponding to the joint query statement and a context relation between the at least two character units, and the using a joint query statement corresponding to a federated data query to obtain at least one operator containing a joint query operator comprises:
  determining the substructure corresponding to the preset joint operational character and the preset screening key character in the at least two character units in the syntax relation structure as the joint query operator, and determining other operator partitioning results by traversing the syntax relation structure; and
  obtaining the at least one operator containing the joint query operator based on the joint query operator and the other operator partitioning results.

9. The device according to claim 7, wherein the at least one first processor is further configured to perform:
  optimizing the syntax relation structure according to a preset optimizing strategy to obtain a target syntax relation structure; wherein the preset optimizing strategy comprises at least one of: column pruning, predicate pushdown or constant folding, and the target syntax relation structure contains at least two target character units corresponding to the joint query statement and a context relation between the at least two target character units; and
  determining the substructure corresponding to the preset joint operational character and the preset screening key character in the at least two target character units in the target syntax relation structure as the joint query operator.

10. The device according to claim 7, wherein the at least one first processor is further configured to perform:
  optimizing the joint query operator through a preset optimizing strategy to obtain a target joint query operator; and
  the transforming the joint query operator to a first joint security operator comprises:
    transforming the target joint query operator to the first joint security operator.

11. The device according to claim 7, wherein the determining first data for intersection on the first electronic device by executing the first joint security operator comprises:
  obtaining the first data for intersection from a preset first storage space according to a first data table name and a first intersecting field name in the first joint security operator by executing the first joint security operator through a first executing engine.

12. The device according to claim 7, wherein the performing joint computing on the first data for intersection and the second data for intersection in a form of a ciphertext to obtain a joint data table comprises:
  encrypting the first data for intersection to obtain first intermediate encrypted data, transmitting the first intermediate encrypted data to the second electronic device, the second electronic device being configured to encrypt the first intermediate encrypted data by executing the second joint security operator to obtain first encrypted data;
  encrypting second intermediate encrypted data transmitted by the second electronic device to obtain second encrypted data and transmitting the second encrypted data to the second electronic device; the second intermediate encrypted data being obtained by encrypting the second data for intersection, and the second data for intersection being determined by the second electronic device by executing the second joint security operator; and
  performing intersecting computing on the first encrypted data transmitted by the second electronic device and the second encrypted data to obtain the joint data table, the joint computing comprising the intersecting computing.

13. A non-transitory computer-readable storage medium, storing an executable instruction, the executable instruction, when executed by at least one first processor of a first electronic device, causing the at least one first processor to perform:
  using a joint query statement corresponding to a federated data query to obtain at least one operator containing a joint query operator, comprising:

parsing the joint query statement to obtain a syntax relation structure; and determining, according to the syntax relation structure, a substructure corresponding to a preset joint operational character and a preset screening key character as the joint query operator;

obtaining, from a preset metadatabase containing operation permissions of records of data tables previously registered by the first electronic device, a preset data table permission corresponding to a first data table name according to the first data table name corresponding to the preset joint operational character in the joint query operator; the first data table name being a table name of a first data table of the first electronic device, and the preset data table permission indicating whether data content corresponding to the first data table name is allowed to participate in federated data queries;

obtaining, from the preset metadatabase, a preset field permission corresponding to a first intersecting field name according to the first intersecting field name contained in an equi-join condition corresponding to the preset screening key character, the preset field permission indicating whether data content corresponding to the first intersecting field name is allowed to participate in federated data queries;

in response to that at least one of the preset data table permission or the preset field permission does not meet a preset joint query permission condition, generating a warning and ending execution of the joint query operator;

in response to that both the preset data table permission and the preset field permission meet the preset joint query permission condition, transforming the joint query operator to a first joint security operator;

determining first data for intersection on the first electronic device by executing the first joint security operator;

receiving second data for intersection from a second electronic device involved in the federated data query;

performing joint computing on the first data for intersection and the second data for intersection in a form of a ciphertext to obtain a joint data table; and determining a federated data query result corresponding to the at least one operator based on the joint data table.

14. The storage medium according to claim 13, wherein the syntax relation structure containing at least two character units corresponding to the joint query statement and a context relation between the at least two character units, and the using a joint query statement corresponding to a federated data query to obtain at least one operator containing a joint query operator comprises:

determining the substructure corresponding to the preset joint operational character and the preset screening key character in the at least two character units in the syntax relation structure as the joint query operator, and determining other operator partitioning results by traversing the syntax relation structure; and obtaining the at least one operator containing the joint query operator based on the joint query operator and the other operator partitioning results.

15. The storage medium according to claim 13, wherein the executable instruction further causes the at least one first processor to perform:

optimizing the syntax relation structure according to a preset optimizing strategy to obtain a target syntax relation structure; wherein the preset optimizing strategy comprises at least one of: column pruning, predicate pushdown or constant folding, and the target syntax relation structure contains at least two target character units corresponding to the joint query statement and a context relation between the at least two target character units; and determining the substructure corresponding to the preset joint operational character and the preset screening key character in the at least two target character units in the target syntax relation structure as the joint query operator.

* * * * *